US008873076B2

(12) United States Patent
Sato

(10) Patent No.: US 8,873,076 B2
(45) Date of Patent: Oct. 28, 2014

(54) INFORMATION PROCESSING APPARATUS, INFORMATION PROCESSING METHOD, INFORMATION PROCESSING SYSTEM, AND STORAGE MEDIUM

(71) Applicant: Canon Kabushiki Kaisha, Tokyo (JP)

(72) Inventor: Tomohiro Sato, Hino (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/888,234

(22) Filed: May 6, 2013

(65) Prior Publication Data

US 2013/0314729 A1 Nov. 28, 2013

(30) Foreign Application Priority Data

May 10, 2012 (JP) .................................. 2012-108684

(51) Int. Cl.
G06K 1/00 (2006.01)
G06F 15/00 (2006.01)
G06F 3/12 (2006.01)
G06K 15/02 (2006.01)

(52) U.S. Cl.
CPC ........ G06K 15/1807 (2013.01); G06K 15/1849 (2013.01); G06F 3/12 (2013.01); G06K 15/1856 (2013.01); G06K 15/1817 (2013.01); G06K 15/1822 (2013.01); G06K 15/1857 (2013.01)
USPC ........................... 358/1.13; 358/1.15; 358/1.1

(58) Field of Classification Search
CPC .................. G06K 15/1807; G06K 15/1817
USPC .................. 358/1.13, 1.15, 1.14, 1.1
See application file for complete search history.

(56) References Cited

U.S. PATENT DOCUMENTS 8,643,853 B2 * 2/2014 Ichikawa .................. 358/1.1
2012/0307269 A1 * 12/2012 Okamura .................. 358/1.9

FOREIGN PATENT DOCUMENTS

JP 2011-167857 A 9/2011

* cited by examiner

Primary Examiner — Douglas Tran
(74) Attorney, Agent, or Firm — Canon USA, Inc. IP Division

(57) ABSTRACT

An information processing system configured to control assignment of processor cores to a processing unit that generates printing data from intermediate data based on an amount of the stored printing data. Intermediate data are generated using a specified processor core of a plurality of processor cores and stored in an intermediate data storing unit. Printing data are generated by processing the intermediate data using a processor core other than the specified processor core, and stored in a printing data storing unit. The number of processor cores used by the first processing unit is adjusted on the basis of an amount of intermediate data stored in the intermediate data storing unit. The number of processor cores used by the second processing unit is adjusted on the basis of an amount of printing data stored in the printing data storing unit.

28 Claims, 14 Drawing Sheets

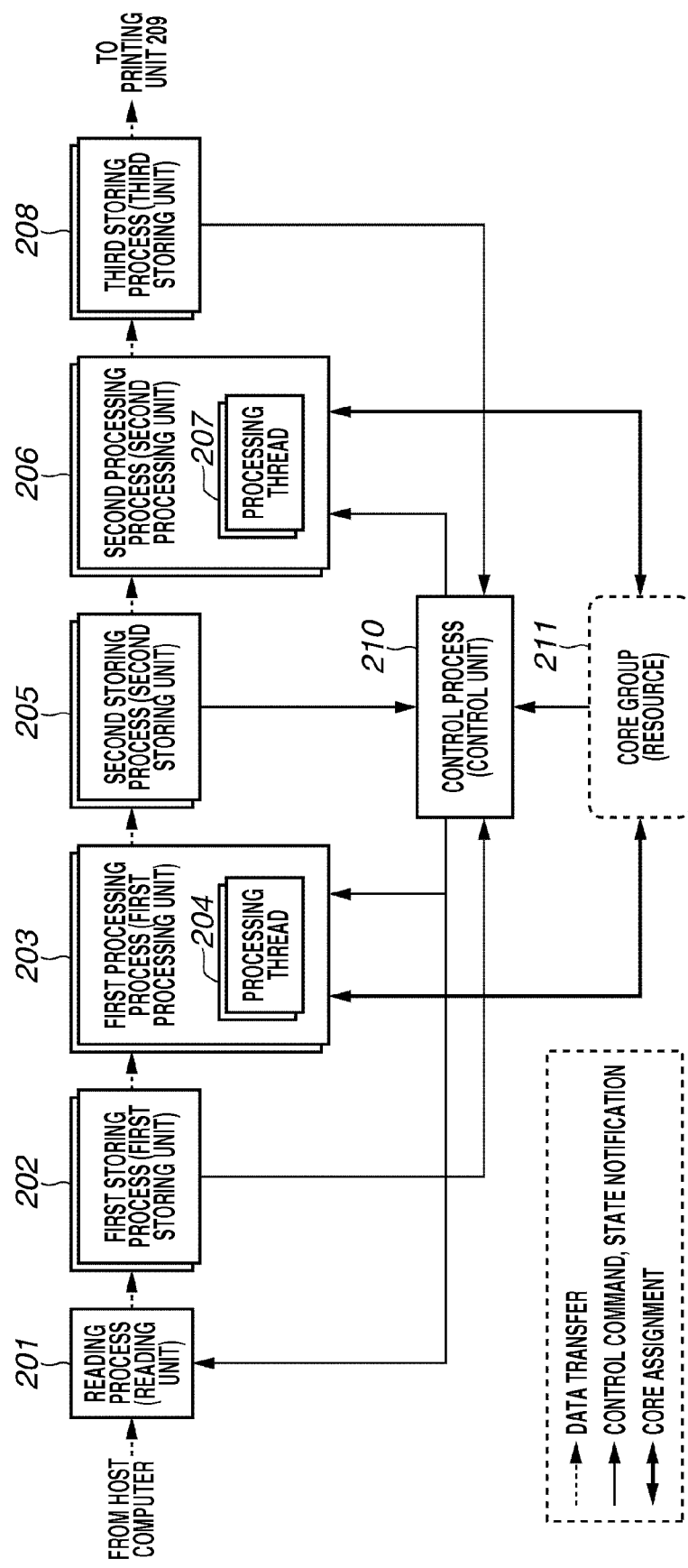

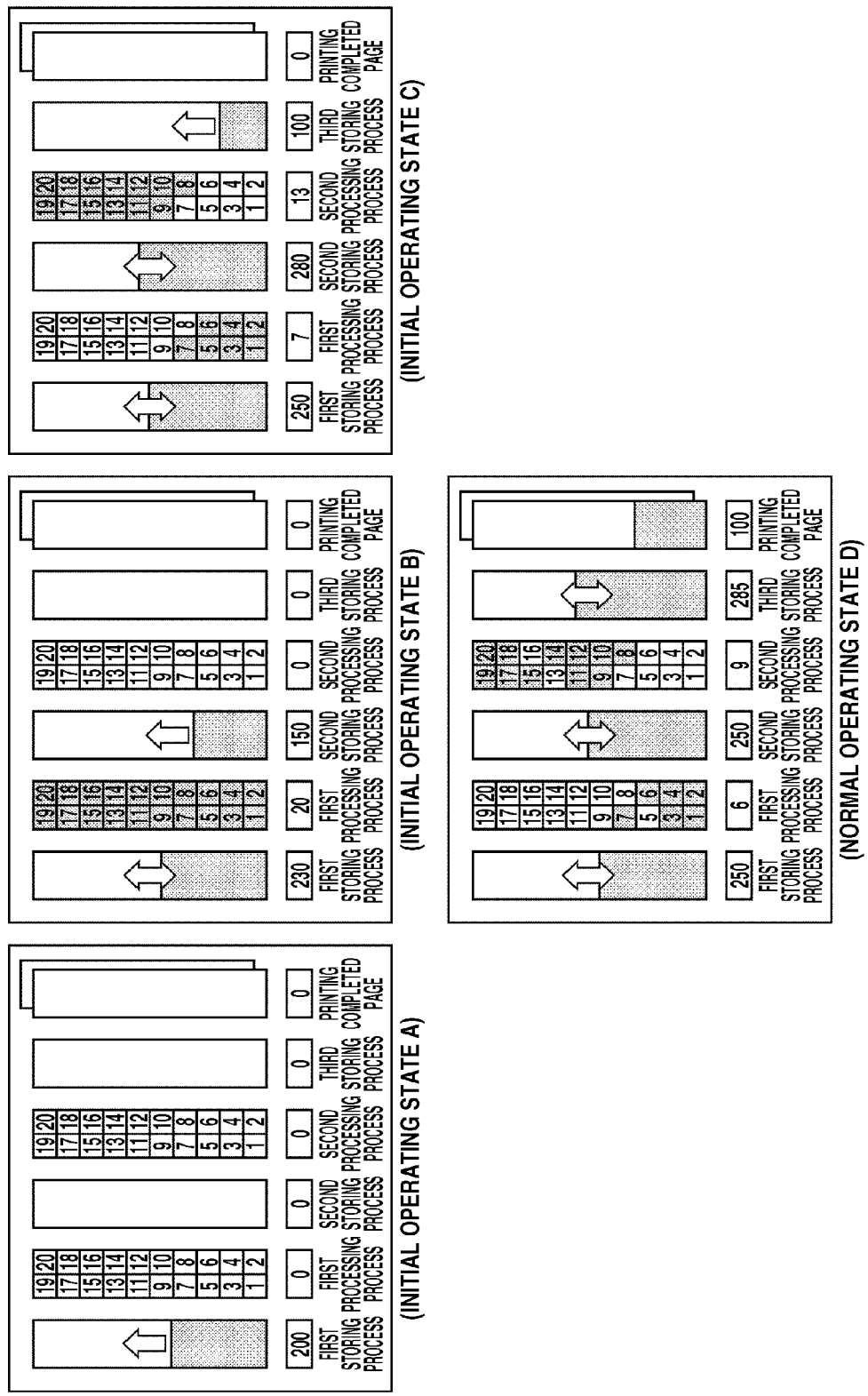

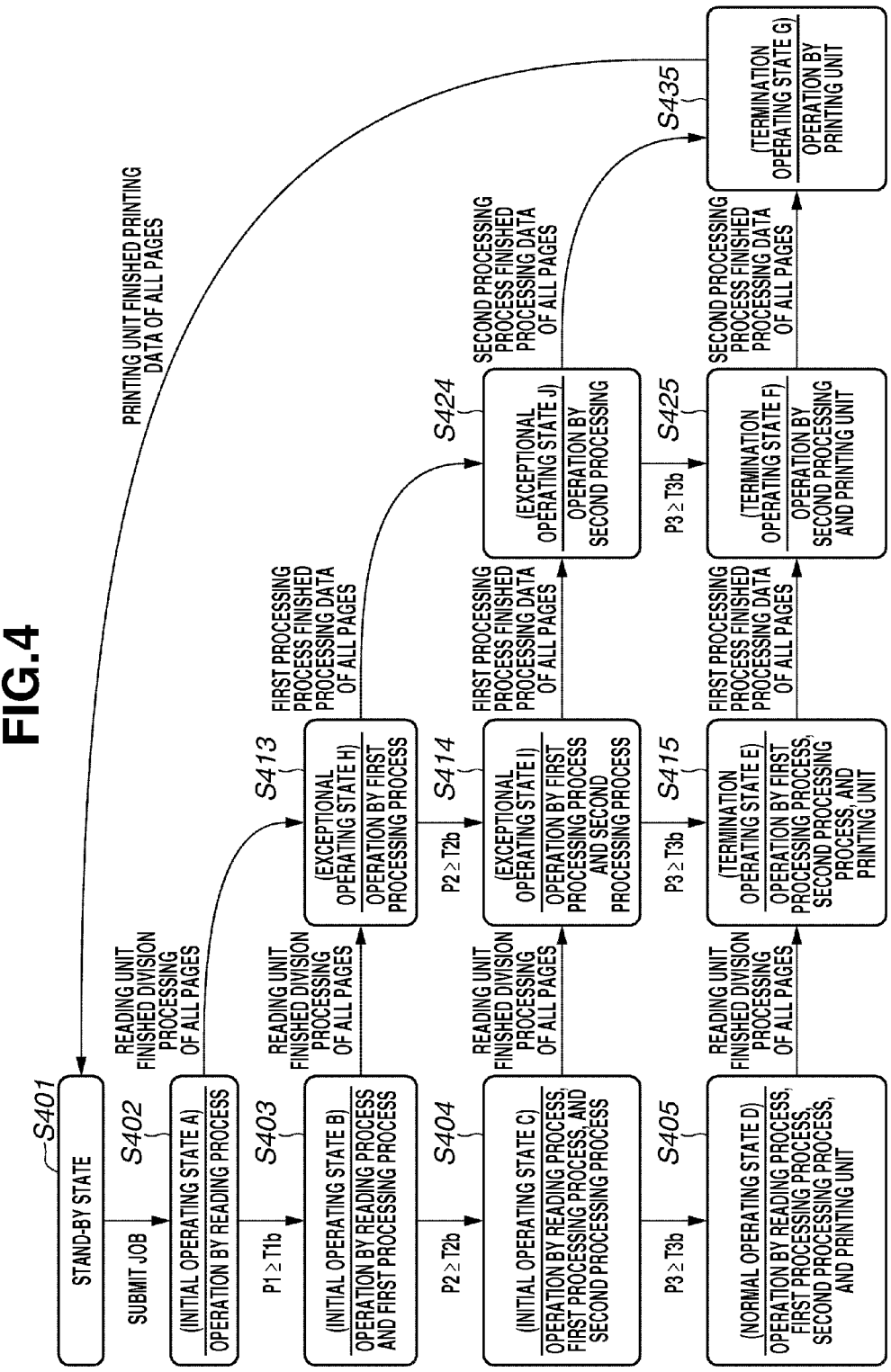

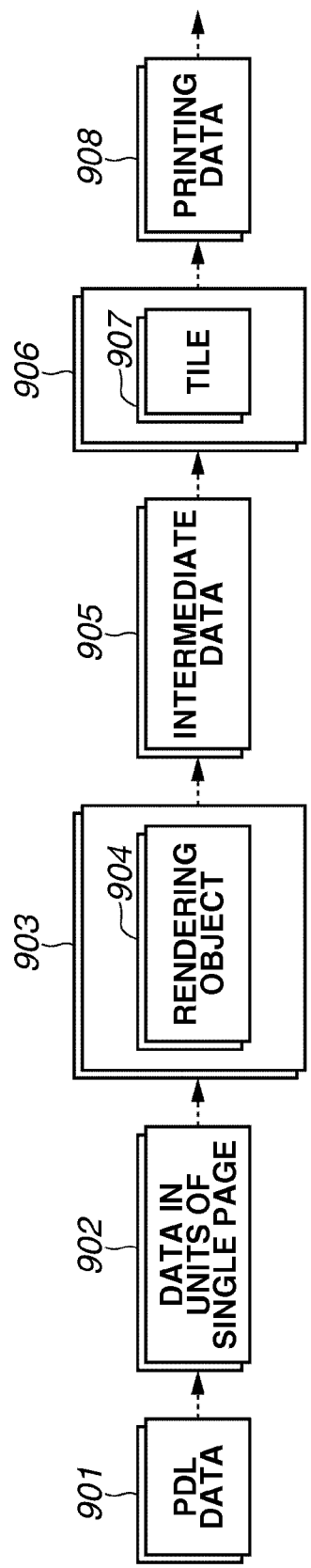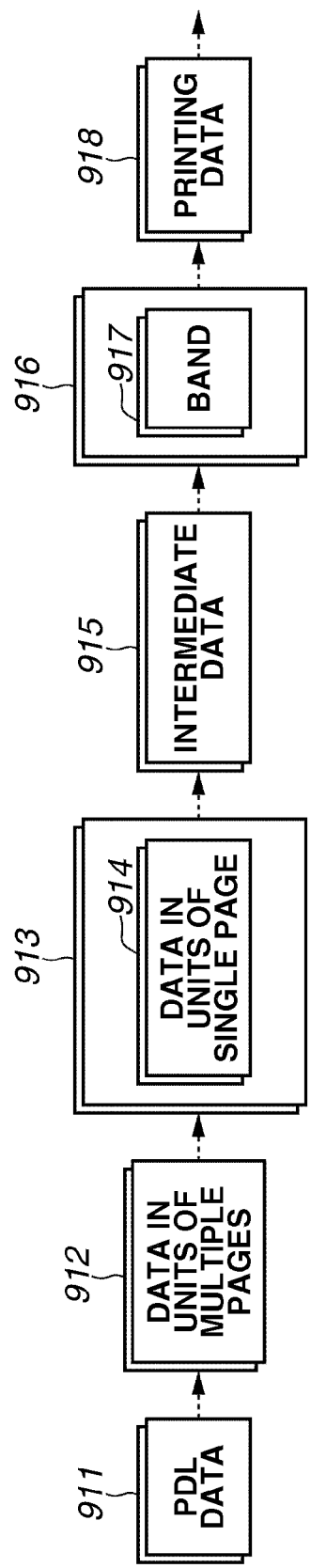

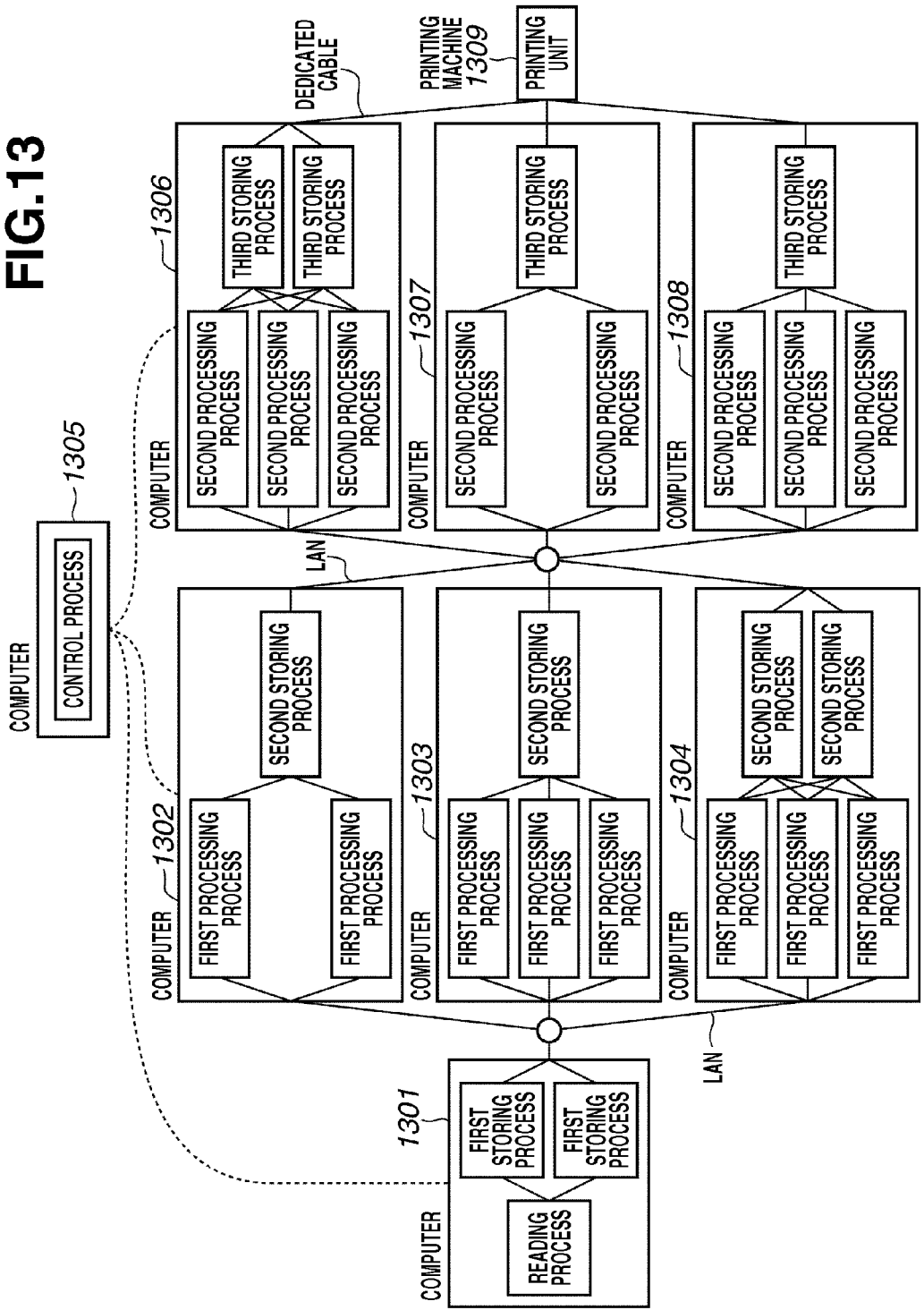

INFORMATION PROCESSING APPARATUS, INFORMATION PROCESSING METHOD, INFORMATION PROCESSING SYSTEM, AND STORAGE MEDIUM

BACKGROUND OF THE INVENTION

1. Field of the Invention

The disclosed aspect of the embodiments relates to an information processing apparatus for managing processing resources, an information processing method, and a storage medium.

2. Description of the Related Art

Conventionally, there is known a printing system employing a pipeline structure. According to this structure, one processing unit can process processing-completed data processed by another processing unit.

Japanese Patent Application Laid-Open No. 2011-167857 discusses a printing system which includes an intermediate data generation unit, a rendering unit. By using a plurality of central processing unit (CPU) cores, the printing system starts the intermediate data generation unit and generates intermediate data from PDL data. The generated intermediate data is rendered by the rendering unit and output to a printing apparatus. Before the generated intermediate data is rendered, the intermediate data is temporarily spooled. If there is enough spooled intermediate data, the rendering unit performs the rendering processing. Then, the rendered image data is printed by the printing apparatus.

However, according to the printing system discussed in Japanese Patent Application Laid-Open No. 2011-167857, the execution of the rendering processing performed by the rendering unit is controlled on the basis of the amount of spooled intermediate data instead of the amount of data after the rendering processing. Thus, when continuous printing of a plurality of sheets is performed by the printing system discussed in Japanese Patent Application Laid-Open No. 2011-167857, if the rendering processing is delayed, the supply of the rendered image data to the printing apparatus will also be delayed. As a result, the printing apparatus will remain idle until the data is supplied.

SUMMARY OF THE INVENTION

According to an aspect of the embodiments, an information processing system including a plurality of processor cores for generating printing data to be supplied to a printing unit from PDL data, includes a first processing unit configured to generate intermediate data by processing the PDL data using a specified processor core of the plurality of processor cores and store the intermediate data in an intermediate data storing unit, a second processing unit configured to generate the printing data by processing the intermediate data stored in the intermediate data storing unit using a processor core other than the specified processor core of the plurality of processor cores, and store the printing data in a printing data storing unit, and a control unit configured to adjust the number of processor cores used by the first processing unit on the basis of an amount of intermediate data stored in the intermediate data storing unit, and adjust the number of processor cores used by the second processing unit on the basis of an amount of printing data stored in the printing data storing unit.

According to an embodiment, since a storing unit for storing data processed by a processing unit is provided, the influence of the variations in the processing time of the processing unit may be reduced. Further, since the number of cores (amount of resources) which are assigned to a processing unit in the subsequent stage is controlled on the basis of the amount of data stored in the storing unit, the processing speed of the processing unit may be adjusted, and data may be stably supplied to the storing unit in the subsequent stage. As a result, the idle time of the unit in the subsequent stage waiting for the processing-completed data output by the unit in the preceding stage may be reduced.

Further features and aspects of the disclosure will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the disclosure and, together with the description, serve to explain the principles of the disclosure.

FIG. 2 is a block diagram illustrating the printing system according to the first exemplary embodiment.

FIG. 3A illustrates operating states A, B, C, and D of the printing system according to the first exemplary embodiment.

FIG. 4 illustrates transition of the operating state of the printing system according to the first exemplary embodiment.

FIGS. 12A and 12B illustrate examples of data granularity of data in units of processing.

FIG. 13 illustrates an example of a blade server on which the printing system is running according to a second exemplary embodiment.

DESCRIPTION OF THE EMBODIMENTS

Figure 1:
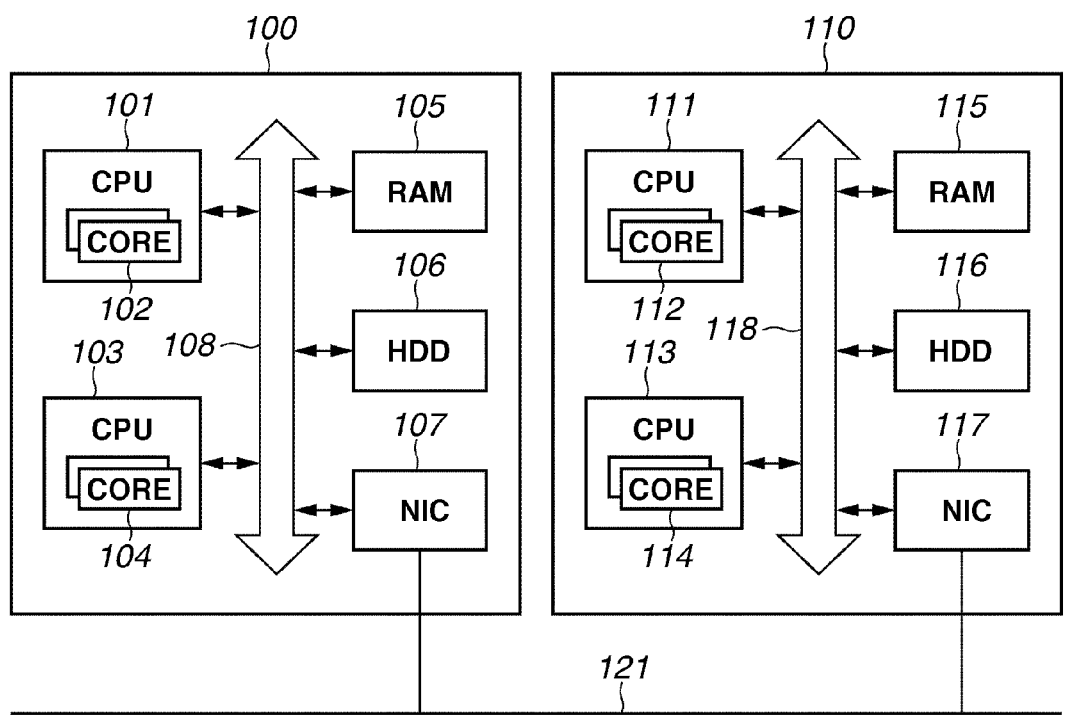
FIG. 1 illustrates a hardware configuration of a printing system according to a first exemplary embodiment.

Various exemplary embodiments, features, and aspects of the disclosure will be described in detail below with reference to the drawings. One disclosed feature of the embodiments may be described as a process which is usually depicted as a flowchart, a flow diagram, a structure diagram, or a block diagram. Although a flowchart may describe the operations as a sequential process, many of the operations may be performed in parallel or concurrently. In addition, the order of the operations may be re-arranged. A process is terminated when its operations are completed. A process may correspond to a method, a program, a procedure, a method of manufacturing or fabrication, etc. One embodiment may be described by a schematic drawing depicting a physical structure. It is understood that the schematic drawing illustrates the basic concept and may not be scaled or depict the structure in exact proportions.

An information processing system according to a first exemplary embodiment is a printing system capable of printing data in a data format printable by a printing apparatus (i.e., printing data) while simultaneously performing data conversion processing of obtained Page Description Language (PDL) data into the printing data. First, a relation between the processing speed of the data conversion processing and the printing speed will be described.

Regarding a high-speed printing machine, since paper is fed at a constant high speed, the printing data needs to be supplied without delay. Further, there is a demand for reducing the time necessary in printing by reducing the time interval from when the PDL data is read to when the printing is started.

Although the printing speed of a printing machine is fixed, the speed of data conversion tends to vary depending on the content of the PDL data of the given job. Since the PDL data includes a plurality of rendering instructions and a combination of images, the processing time varies according to the number and the complexity of the instructions and the images. If the conversion processing of the printing data is not completed by the time of printing, time will be wasted and productivity will be reduced. In order to prevent such a problem, it is necessary to convert the data at a speed faster than the printing speed of the printing machine.

Further, when parallel processing of data is performed, if the processing time of the data in units of processing is different, the order of the data when the processing is started does not always match the order of the data when the processing is finished. For example, if data is converted in the order of "N-th page, N+1-th page", the printing data may be generated in the order of "N+1-th page, N-th page". If the printing data is printed in the order the printing data has been generated, the printing order may be different from the original order. Thus, a predetermined amount of printing data is stored in a storing unit and data is output from the storing unit in the order the data is subjected to the conversion processing. Storing a predetermined amount of printing data in the storing unit is also useful as the storing unit functions as a buffer when the speed of the data conversion processing varies.

In storing a predetermined amount of data in the storing unit, since the amount of data to be stored is affected by the amount of printing data input in and output from the storing unit, the processing speed of the entire system needs to be adjusted. As a method for adjusting the processing speed, the number of first processing units and second processing units is increased or decreased. The first and the second processing units operate in a parallel manner and are described below.

The first exemplary embodiment will be described below with reference to the drawings.

A printing system according to the present exemplary embodiment prints printing data while converting PDL data into the printing data. As illustrated in FIG. 1, the printing system includes, for example, computers 100 and 110. The computer 100 includes a plurality of central processing units (CPUs) 101 and 103, a random access memory (RAM) 105, a hard disk drive (HDD) 106, and a network interface card (NIC) 107. These units are communicably connected to one another via a system bus 108. The CPUs 101 and 103 control the overall operation of each unit connected to the system bus 108 by executing a program stored in the RAM 105 or the HDD 106. In other words, the CPUs 101 and 103 read out a processing program that realizes the operation described above from the HDD 106, execute the program, and control and realize the operation of the present exemplary embodiment. The RAM 105 functions as a main memory and a work area of the CPUs 101 and 103. The NIC 107 and a NIC 117 are communicably connected via a local area network (LAN) 121 and receive PDL data from a host computer (not illustrated). The configuration and operation of the computer 110 are similar to those of the computer 100.

The CPU 101 according to the present exemplary embodiment is a multi-core processor including a plurality of processor cores 102. The CPU 101 operates each process by executing a processing program. A process is an execution unit of a program which is running. The configuration and operation of the CPUs 103, 111, and 113 are similar to those of the CPU 101. Further, one process includes one or more threads. A thread is an execution unit of a process which is being processed. Each process may also be called a processing unit. For example, a control process 210 may also be called a control unit. Similarly, a reading process 201, a first processing process 203, and a second processing process 206 may also be called, a reading unit, a first processing unit, and a second processing unit. Similarly, a first storing process 202, a second storing process 205, and a third storing process 208 may also be called a first storing unit, a second storing unit, and a third storing unit. Further, in the description below, a processor core is simply called a core or a resource. Furthermore, as is described below with reference to FIGS. 3A and 3B, each of the plurality of processor cores of the CPUs 101, 103, 111, and 113 in the computers 100 and 110 is identified by a serial number (1 to 20) numbered serially in the order of the CPU. According to the present exemplary embodiment, as an example of the assignment of the serial numbers, the serial numbers are assigned in the order of the processor cores of the CPU 101, the CPU 103, the CPU 111, and the CPU 113.

A thread is executed using one of a plurality of cores. If a plurality of different types of processing of a plurality of processes or a plurality of threads is simultaneously executed, it means that parallel processing of the processes/threads is performed. The assignment of a core to a thread, in other words, the determination of a core to be used for a thread is normally managed by an operating system (OS). More precisely, a core to be used for a thread is automatically assigned to the thread according to a use state of the cores by other processes and threads in the computer.

The mapping of the threads to cores may be many-to-one according to the management by the OS. If a plurality of threads runs on one core, data in a memory area and a cache of the threads which are running is stored in a different memory area, and data in a memory area and a cache of previously-processed threads is stored in the original memory area and the cache. This operation is repeatedly performed. Thus, parallel processing (pseudo parallel processing) is realized by dividing the processing of the plurality of threads in a chronological order and changing the processing in a short time.

On the other hand, according to the parallel processing where the mapping of the threads to the cores is one-to-one according to the management of the processing program, unlike the parallel processing where a plurality of threads runs on one core, data is not stored in a different memory area and cache. Thus, the processing is efficiently processed.

The control process 210 sets one affinity mask (a relation table including information of the thread which is running and the core used in the processing of the thread) for one thread. By using this affinity mask, the control process 210 may limit the core to be used for the thread to one or more cores designated by the affinity mask. According to the present exemplary embodiment, by setting one core to be used by the affinity mask, one-to-one mapping of the thread to the core may be realized. Thus, if a plurality of threads is running, each core used by each of the threads is controlled by the affinity mask so that it is not used by a different thread.

According to the present exemplary embodiment, "assigning a core to a thread" is defined as "the control process 210 setting an affinity mask so that one thread runs on a particular core and other threads do not run on that core". Further, "assigning cores to each process" is defined as "assigning cores to one or more threads included in the process". The number of cores assigned to the process is equal to the number of threads included in the process. For example, if two cores are assigned to a process, two threads run in that process. Further, each of the two cores is assigned to each thread by the affinity mask so that the use of the cores does not overlap.

FIG. 2 is a system block diagram of the printing system having a pipeline structure. The printing system according to the present exemplary embodiment is realized by the CPUs 101 and 103 executing a processing program stored in the HDD 106. Further, the printing system includes a plurality of processes (processing units). They are: the reading process (reading unit) 201, the first storing process (first storing unit) 202, the first processing process (first processing unit) 203, the second storing process (second storing unit) 205, the second processing process (second processing unit) 206, and the third storing process (third storing unit) 208. The third storing process 208 communicates with a printing unit 209. According to the present exemplary embodiment, the first storing process 202 and the second storing process 205 operate in the computer 100 using the HDD 106 and the third storing process 208 operates in the computer 110 using a HDD 116. The location of the operation is not limited to the above-described example.

The reading process 201 reads the PDL data received via the NIC 107 and breaks down the data into units of processing such as PDL data in page units. Then, the reading process 201 sends the data in units of processing to the first storing process 202. The first storing process 202 functions as a storing unit of the data in units of processing, which is supplied to the first processing process 203 in the subsequent stage. If the data in units of processing is PDL data, the storing unit of the data in units of processing may be called a PDL data storing unit.

The first processing process 203 reads the data in units of processing stored in the first storing process 202. Then, by a processing thread 204 inside, the first processing process 203 converts the data in units of processing into intermediate data such as a display list. The display list is information for each rendering unit (e.g., object) in the data in units of processing. Then, the first processing process 203 sends the intermediate data to the second storing process 205. Since the second storing process 205 stores the intermediate data, it functions as an intermediate data storing unit.

The second processing process 206 reads the intermediate data stored in the second storing process 205. Then, by a processing thread 207 inside, the second processing process 206 converts (renders) the intermediate data into printing data such as bitmap data. The bitmap data is data in a format which may be processed by the printing unit 209. Then, the second processing process 206 sends the printing data to the third storing process 208. Since the third storing process 208 stores the printing data, it functions as a printing data storing unit.

The printing unit 209 reads the printing data stored in the third storing process 208, and prints the data at a predetermined speed.

The control process 210 monitors the processing state of the plurality of processor cores (a core group 211) in the computers 100 and 110. Further, the control process 210 monitors the use state of the memory of the first storing process 202, the second storing process 205, and the third storing process 208. Further, the control process 210 monitors the operation state of the reading process 201, the first processing process 203, the second processing process 206, and the printing unit 209. Further, as described below with reference to drawings, the control process 210 assigns some cores of the core group 211 to the first processing process 203 and the second processing process 206 according to a use state of the memory and a processing state of the core group 211. The assignment of the cores performed by the control process 210 is exclusive. In other words, the core assigned to the first processing process 203 is not assigned to the second processing process 206, and the core assigned to the second processing process 206 is not assigned to the first processing process 203. Thus, the core assigned to the second processing process 206 is a core other than the core of the core group 211 assigned to the first processing process 203.

In the description below, the first processing process 203 and the second processing process 206 are collectively called a processing process. Further, the first storing process 202, the second storing process 205, and the third storing process 208 are collectively called a storing process.

The data in units of processing stored in the first storing process 202 may also be called first processing data. Further, the intermediate data stored in the second storing process 205 may also be called second processing data and the second storing process 205 may also be called a first data storing unit. Furthermore, the printing data stored in the third storing process 208 may also be called third processing data and the third storing process 208 may also be called a second data storing unit.

Since the first processing process 203 generates the second processing data by processing the first processing data, the first processing process 203 may also be called a first processing unit. Further, since the second processing process 206 generates the third processing data by processing the second processing data, the second processing process 206 may also be called a second processing unit.

Each of threshold values T1$a$, T1$b$, T2$a$, T2$b$, T2$c$, T1$a$, T3$b$, and T3$c$ described below is set to such a value that does not cause delay in the supply of the printing data to the printing unit 209.

Figure 3B:
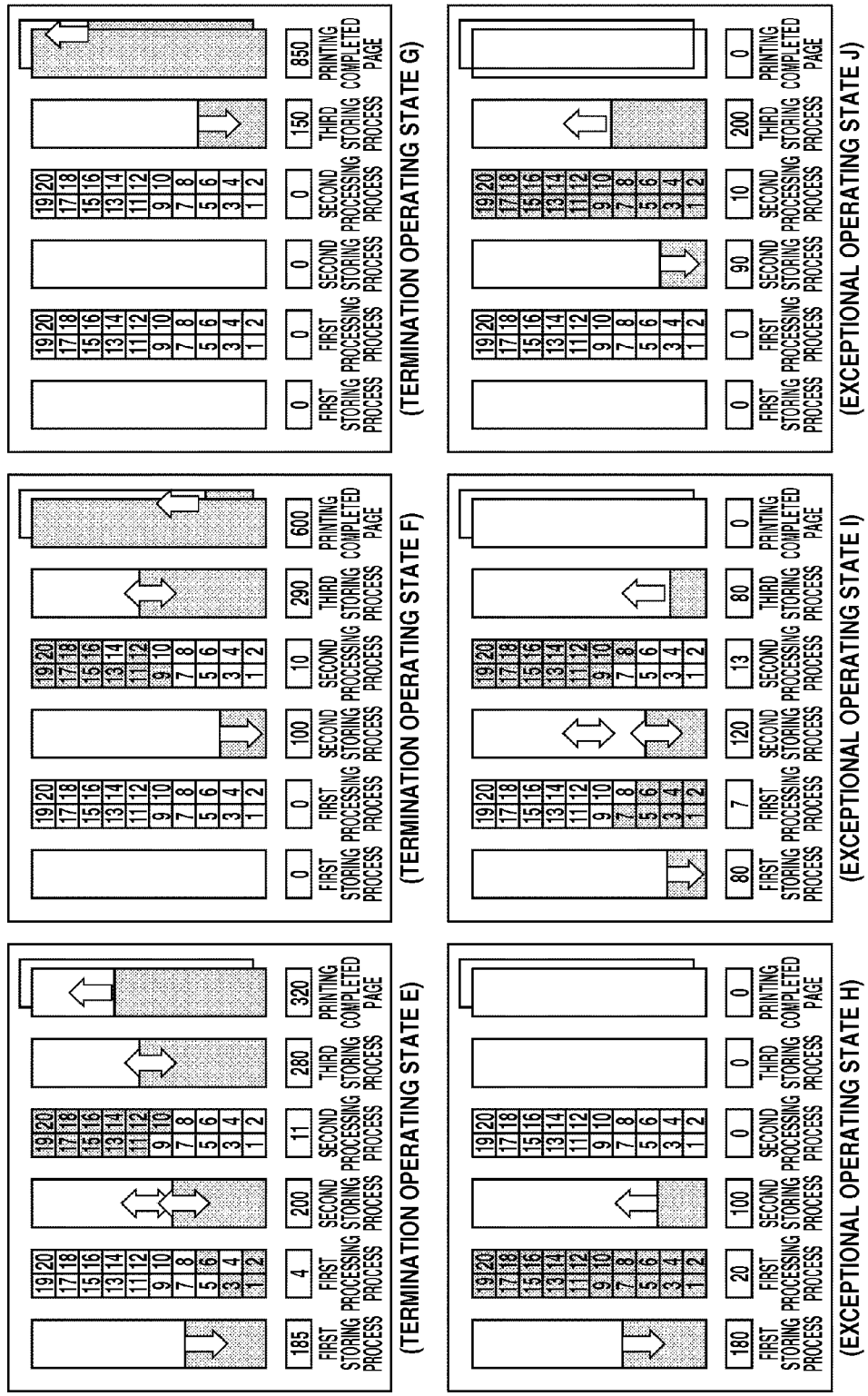
FIG. 3B illustrates operating states E, F, G, H I and J of the printing system according to the first exemplary embodiment.

Next, a case where the PDL data is divided into data in units of processing (data in page units) will be described with reference to FIGS. 3A and 3B. FIGS. 3A and 3B illustrate the operating states of the printing system.

An initial operating state A, an initial operating state B, and an initial operating state C represent the transition of the operating states after a job is submitted to the printing system until the printing is started by the printing unit 209.

A normal operating state D represents a state of "Raster Image Processing (RIP) while Print". When the printing system is in this state, the printing unit 209 prints data while PDL data is read from the HDD 106.

A termination operating state E, a termination operating state F, and a termination operating state G represent the transition of the operating states after the reading of the PDL data is finished. The printing unit sequentially prints the data processed by the processing process or the data stored in the storing process.

An exceptional operating state H, an exceptional operating state I, and an exceptional operating state J represent the transition of the operating states after the reading of the PDL data is finished before the printing by the printing unit 209 is started.

Next, the operating states in FIG. 3A will be described taking the normal operating state D as an example.

Numeric characters provided in each box above each of the first storing process 202, the second storing process 205, and the third storing process 208 indicate the number of pages stored in the storing process. A bar graph (black portion) above the box indicates the number of pages. An arrow overlapping the bar graph indicates whether the number of pages is increasing/decreasing. An upward-pointing arrow indicates that the number of pages is increasing. A downward-pointing arrow indicates that the number of pages is decreasing. Further, a double-headed arrow indicates that the number of pages varies within a certain range. A number, a graph, and an arrow associated with "the printing-completed page" have meanings similar to those associated with the storing process. Thus, the illustration of the normal operating state D in FIG. 3A indicates that 250 pages of data in units of processing are stored in the first storing process 202. Similarly, the number of the pages stored in the second storing process 205 and the third storing process 208 are 250 pages and 285 pages. Further, the number of the printing-completed pages is 100 pages. Additionally, the illustration of the normal operating state D in FIG. 3A indicates that the number of pages stored in the first storing process 202 varies within a certain range. Similarly, each of the number of pages stored in the second storing process 205 and the third storing process 208 varies within a certain range. The number of the printing-completed pages is increasing.

Numeric characters provided in each box above each of the first processing process 203 and the second processing process 206 indicate the number of cores assigned to the corresponding processing process. The number of cores assigned to the processing process is equal to the total number of threads in that processing process operating in the printing system. Further, each of the 20 rectangular patterns above each processing process indicates the number of cores assigned to that process. According to the example illustrated in FIGS. 3A and 3B, a maximum of 20 cores, each of which is represented by one rectangular pattern, are assigned to indicate the operation state. The cores represented by these rectangular patterns are shared between the first processing process 203 and the second processing process 206. Thus, a core assigned to the first processing process 203 at one time may be assigned to the second processing process 206 at a different time. The rectangular pattern of dots represents a core assigned to each processing process and a rectangular pattern without dots represents an unused core which is not assigned to the processing process. The unused core is a core which is not used for the first processing process 203 and the second processing process 206.

Further, each core is identifiable. If, as illustrated in FIGS. 3A and 3B, a serial number (1 to 20) is assigned to each core, then the normal operating state D in FIG. 3A indicates that the cores corresponding to the numbers 1 to 4, 6, and 7 are assigned to the first processing process 203 and the cores corresponding to the numbers 8 to 12, 14, 15, and 17 to 20 are assigned to the second processing process 206. The assignment of the cores to each process is enabled since the control process 210 sets one affinity mask for each processing process and manages the core assignment to all the processing processes. Thus, the control process 210 may constantly keep track of the unassigned (unused) cores.

According to the present exemplary embodiment, the control process 210 selects cores in ascending order of serial numbers from the unassigned cores and assigns them to the first processing process 203. On the other hand, the control process 210 selects cores in descending order of serial numbers from the unassigned cores and assigns them to the second processing process 206. Further, the first storing process 202 and the second storing process 205 according to the present exemplary embodiment are set in the computer having a smaller serial number and the third storing process 208 is set in the computer having a larger serial number. According to the present exemplary embodiment, the cores with the serial numbers 1 to 10 are the processor cores of the computer 100 and the cores with the serial numbers 11 to 20 are the processor cores of the computer 110.

Next, the assignment method of the cores will be described. If a core is assigned to a processing process, it means that the computer (e.g., the computer 100) that operates the processing process is identified. If a processing process and a storing process operate on a same computer (e.g., the computer 100), only the system bus 108 will be used for the data transfer between the processing process and the storing process. On the other hand, if a processing process operates on a computer (e.g., the computer 110) different from the computer of the storing process, the system bus 108, the LAN 121, and a system bus 118 will be used for the data transfer between the processing process and the storing process.

For example, as described in the present exemplary embodiment, by setting the operation location of each storing process in a pipeline structure illustrated in FIG. 2, the data transfer distance between each processing process and the corresponding storing process may be reduced. In other words, the first storing process 202, the first processing process 203, and the second storing process 205 may operate in a same computer (the computer 100), and the second processing process 206 and the third storing process 208 may operate in another same computer (the computer 110). As described above, the serial numbers of the cores in the computer 100 are smaller than the serial numbers of the cores in the computer 110. Thus, when the cores are assigned to each processing process by the above-described control process 210, the number of times the data is transferred via the LAN 121, having a slower communication speed than a system bus 108, may be reduced. Accordingly, improved communication throughput may be expected. This method is especially effective in a case where data of a large size is transferred and shortage of the communication bandwidth of the LAN is likely to occur.

The assignment of the unassigned cores performed by the control process 210 described above is determined according to whether the unassigned cores are to be assigned to the first processing process 203 or the second processing process 206.

On the other hand, if the cores to be used are assigned without differentiating between the first and the second processing units, since the communication load of the system bus 108 (e.g., memory access from cores) may be distributed, enhanced processing speed of the processing process may be expected. This method is especially effective when there are enough hardware resources (e.g., enough number of cores and communication bandwidth of LAN).

Next, an outline of the operating states of the system and the assignment of the processor cores will be described with reference to FIGS. 4 and 5.

First, FIG. 4 is a transition diagram of operating states of the printing system. The states of the system will be described in order based on an actual operation example.

When a job (print instruction) is input to the printing system in a standby state (state S401), the state of the printing system is changed to the initial operating state A (state S402). In the initial operating state A, the reading process 201 reads the PDL data and divides the data. The generated data, which is in units of processing, is stored in the first storing process 202. When the printing system is in the initial operating state A, if a number of pages P1 stored in the first storing process 202 is equal to or greater than a threshold value T1b, the state is changed to the initial operating state B (state S403). In the initial operating state B, the first processing process 203 processes the data using all the cores in the core group 211. The generated intermediate data is stored in the second storing process 205. When the printing system is in the initial operating state B, if a number of pages P2 stored in the second storing process 205 is equal to or greater than the threshold value T2b, the state is changed to the initial operating state C (state S404). In the initial operating state C, the second processing process 206 processes the data, and the generated printing data is stored in the third storing process 208. When the printing system is in the initial operating state C, if a number of pages P3 stored in the third storing process 208 is equal to or greater than a threshold value T3b, the state is changed to the normal operating state D (state S405).

In the normal operating state D, the printing unit 209 prints the data according to the "RIP while Print". When the printing system is in the normal operating state D, if the reading and dividing of all the PDL data by the reading process 201 is finished, the operation of the reading process 201 is stopped and the state of the system is changed to the termination operating state E (state S415).

In the termination operating state E, the flow of data in units of processing into the first storing process 202 is stopped. Only the first processing process 203, the second processing process 206, and the printing unit 209 operate in this state. When the printing system is in the termination operating state E, if the number of pages stored in the first storing process 202 is reduced to zero, the state of the first processing process 203 is changed to a standby state, and the state of the system is changed to the termination operating state F (state S425). In the termination operating state F, the flow of intermediate data into the second storing process 205 is stopped. Only the second processing process 206 and the printing unit 209 operate in this state. When the printing system is in the termination operating state F, if the number of pages stored in the second storing process 205 is reduced to zero, the state of the second processing process 206 is changed to a standby state, and the state of the system is changed to the termination operating state G (state S435). In the termination operating state G, the flow of printing data into the third storing process 208 is stopped. Only the printing unit 209 operates in this state. When the printing system is in the termination operating state G, if the number of pages stored in the third storing process 208 is reduced to zero, it means that printing of all pages is finished, which also means that the job is completed. Then, the state of the system returns to the standby state (state S401).

Further, the exceptional operating state is a state obtained by skipping the normal operating state D (state S405). Accordingly, printing by the "RIP while Print" is not performed. Thus, printing by the printing unit 209 is not started unless the PDL data of all pages is read and the division processing is finished. The system is likely to be in this state when the threshold value of the storing process is greater than the number of pages of the PDL data which has been input as the print job or the number of pages of the PDL data which has been input is small. Further, if the processing performed by the reading process 201 is stopped when the system is in the initial operating state A (state S402) or the initial operating state B (state S403), the state is changed to the exceptional operating state H (state S413).

In the exceptional operating state H, only the first processing process 203 operates. Further, if the processing performed by the reading process 201 is stopped when the system is in the initial operating state C (state S404) or if the number of pages P2 stored in the second storing process 205 is equal to or greater than the threshold value T2b when the system is in the exceptional operating state H (state S413), the state is changed to the exceptional operating state I (state S414). In the exceptional operating state I, only the first processing process 203 and the second processing process 206 operate. If the number of pages P3 stored in the third storing process 208 is equal to or greater than the threshold value T3b when the system is in the exceptional operating state I, the state is changed to the termination operating state E (state S415). If the number of pages stored in the first storing process 202 is reduced to zero when the system is in the exceptional operating state H (state 5413) or the exceptional operating state I (state S414), the state of the first processing process 203 is changed to a standby state, and the state of the system is changed to the exceptional operating state J (state S424). In the exceptional operating state J, only the second processing process 206 operates. If the number of pages P3 stored in the third storing process 208 is equal to or greater than the threshold value T3b when the system is in the exceptional operating state J, the state is changed to the termination operating state F (state S425). If the number of pages stored in the second storing process 205 is reduced to zero when the system is in the exceptional operating state J, the state of the second processing process 206 is changed to a standby state, and the state of the system is changed to the termination operating state G (state S435).

Next, an outline of the core assignment performed by the control process 210 according to the present exemplary embodiment will be described with reference to FIG. 5. FIG. 5 illustrates a relation between the number of pages stored in the storing process, threshold value, and operation timing.

The control process 210 adjusts the number of cores to be assigned to the first processing process 203 and the second processing process 206 when the state of the storing processes changes (i.e., when the processing of the first processing process 203 or the second processing process 206 is finished).

When the printing system receives a print job including PDL data, the control process 210 instructs the reading process 201 to read the PDL data and divide the data in units of processing (the initial operating state A). Then, the data in units of processing, which has been generated by the reading process 201, is stored in the first storing process 202. The control process 210 determines the number of pages stored in each storing process when it receives a processing complete report from the reading process 201. If the number of pages is equal to or greater than a threshold value, the control process 210 instructs the processing processes or the printing unit 209 to start processing the data and adjust the processing speed of the reading process 201. The threshold values of the first storing process 202 are T1a and T1b in the descending order. If the number of pages stored in the first storing process 202 is between the threshold values T1a and T1b, it means that a sufficient number of pages is stored and the input/output speed of the data is stable. Similarly, the threshold values of the second storing process 205 are T2a, T2b, and T2c, and the threshold values of the third storing process 208 are T1a, T3b, and T3c. When the number of pages stored in the first storing process 202 is equal to or greater than the threshold value T1b, the control process 210 instructs the first processing process 203 to start processing the data (the initial operating state B). Further, when the number of pages stored in the second storing process 205 is equal to or greater than the threshold value T2b, the control process 210 instructs the second processing process 206 to start processing the data (the initial operating state C). Furthermore, when the number of pages stored in the third storing process 208 is equal to or greater than the threshold value T3$b$, the control process 210 instructs the printing unit 209 to start printing the data (the normal operating state D). Thus, although only the reading process 201 is operating when the operation of the printing system is started, as time passes, the first processing process 203, the second processing process 206, and the printing unit 209 start to operate. Then, the input of the PDL data and the output of the data to the printing unit 209 are simultaneously performed. Accordingly, the RIP while Print is realized. Further, until the operation of the second processing process is started, the cores are assigned to the first processing process 203 in units of two cores until the number reaches the maximum number. In this manner, high-speed processing is realized. Further, the start-up time (i.e., from when the reading of the PDL data is started until the operation of the printing unit 209 is started) may be reduced.

The processing speeds of the reading process 201 and the control process 210 are adjusted by the control process 210 according to the number of pages or the amount of data stored in the storing process before/after the data flow.

Since the processing performed by the reading process 201 is finished in a time shorter than the processing processes, the amount of data input in the first storing process 202 is likely to be greater than the amount of data which is output. If the reading process 201 simply continues to perform its processing and the amount of data in units of processing stored in the first storing process 202 (e.g., number of pages if the data is processed in units of pages) keeps on increasing, the amount of memory which the first storing process 202 uses in storing the data in units of processing will also increase. In order to prevent this from occurring, the control process 210 monitors the number of pages stored in the first storing process 202 and instructs the reading process 201 to stop reading the data if the number of pages reaches the threshold value T1$a$ or greater. On the other hand, when the number of pages is reduced to a number smaller than the threshold value T1$a$, the control process 210 instructs the reading process 201 to restart the processing. In this manner, use of a large amount of memory due to storage of a number of pages that greatly exceeds the threshold value T1$a$ may be prevented.

The control process 210 improves the throughput by efficiently assigning the cores to the first processing process 203 and the second processing process 206. When the control process 210 receives a notification from either the first processing process 203 or the second processing process 206 informing that the processing has been completed, the control process 210 obtains the number of pages stored in the storing process subsequent to the processing process and causes the processing to branch. In the case of the first processing process 203, if the number of pages P2 stored in the second storing process 205 is equal to or smaller than the threshold value T2$c$, the control process 210 determines that a shortage of the intermediate data may be caused during the printing operation by the printing unit 209 and greatly accelerates the processing speed of the first processing process 203. Similarly, if the number of pages P2 is equal to or smaller than the threshold value T2$b$, the control process 210 moderately accelerates the processing speed. If the number of pages P2 is equal to or smaller than the threshold value T2$a$, the control process 210 maintains the processing speed. Further, if the number of pages P2 is greater than the threshold value T2$a$, the control process 210 decelerates the processing speed and reduces the amount of memory used by the second storing process 205. As described below, the acceleration and deceleration of the processing speed is determined according to the number of cores assigned to each processing process.

If the processing speed is to be greatly accelerated, the control process 210 determines whether two sets of two unused cores in the same computer exist in a plurality of computers by using an affinity mask. If such unused cores exist, the control process 210 sets the affinity mask to each of the two first processing processes 203 so that the two cores are assigned to each of them, and instructs the two first processing processes 203 to start processing the data. If the first processing process 203 used one core in the previous processing, since the two first processing processes 203 use a total of four cores, it means that the processing speed has quadrupled.

If the processing speed is to be moderately accelerated, the control process 210 determines whether two unused cores exist in the same computer by using an affinity mask. If such unused cores exist, the control process 210 sets the affinity mask to the first processing process 203 so that the two cores are assigned to the processing process 203, and instructs the first processing process 203 to start processing the data. If the first processing process 203 used one core in the previous processing, since the first processing process 203 uses two cores, it means that the processing speed has doubled.

If the processing speed is to be maintained, the control process 210 determines whether one unused core exists in the same computer by using an affinity mask. If such an unused core exists, the control process 210 sets the affinity mask to the first processing process 203 so that the core is assigned to the processing process 203, and instructs the first processing process 203 to start processing the data. If the first processing process 203 used one core in the previous processing, since the first processing process 203 uses one core, it means that the processing speed is unchanged.

If the processing speed is to be reduced, the control process 210 sets the first processing process 203, which has sent a notification informing that it has finished the processing, to a standby state and sets the cores to an unused state. If the first processing process 203 used one core in the previous processing, since the first processing process 203 stops the operation, the processing speed will be reduced.

Figure 5:
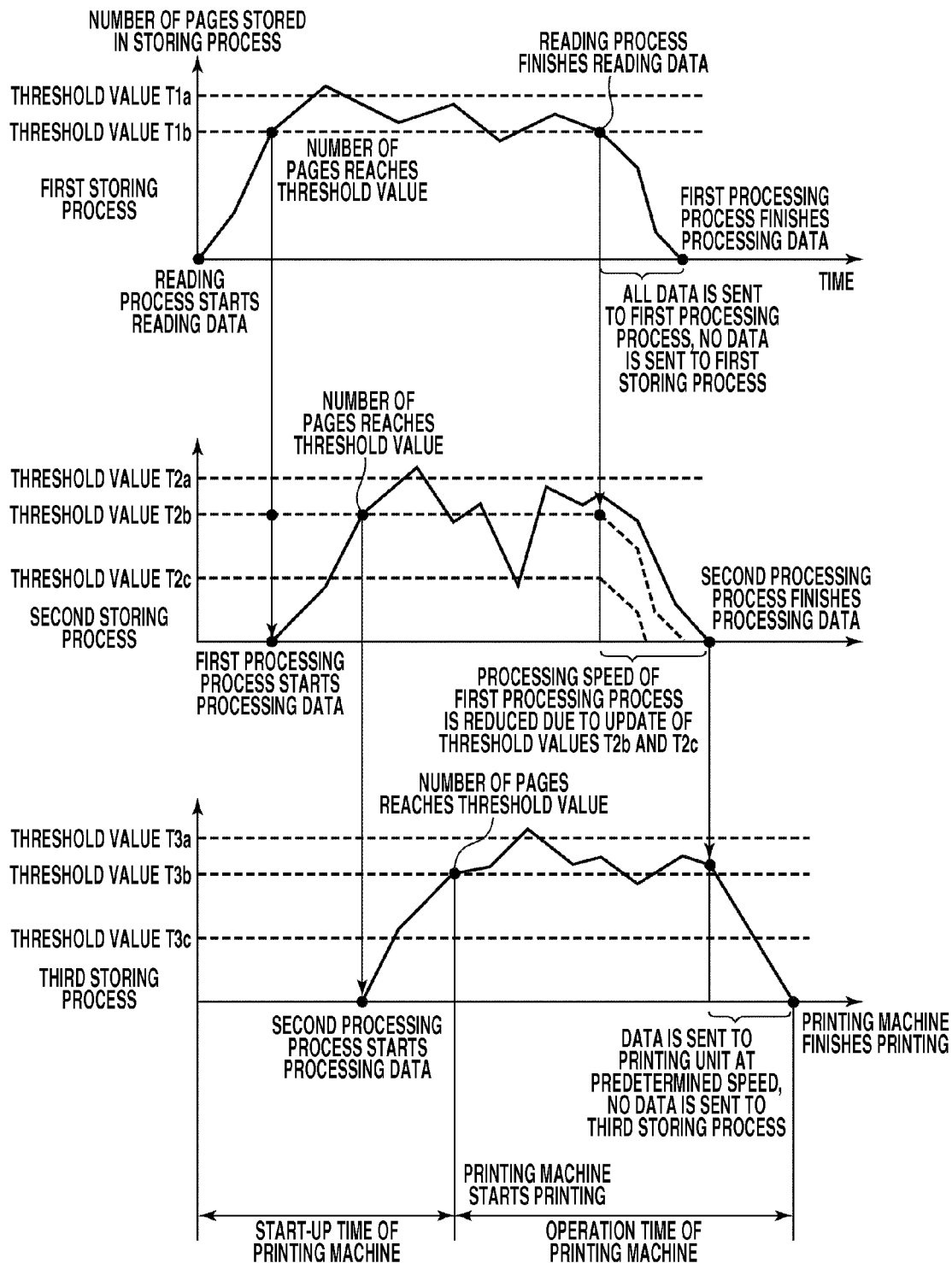
FIG. 5 illustrates a relation between a number of pages, a threshold value, and operation timing stored in a storing process according to the first exemplary embodiment.

If the number of pages which is stored in the first storing process 202 is smaller than the threshold value T1$b$, since the necessity for accelerating the processing speed is reduced, the control process 210 reduces the threshold value T2$b$ to a value same as the number of pages such as the threshold value T2$b$ of the second storing process 205 is reduced in FIG. 5. Further, the control process 210 reduces the threshold value T2$c$ by an amount same as the amount of reduction of the threshold value T2$b$. In this manner, the number of cores assigned to the first processing process 203 will be reduced and the number of the unassigned (unused) cores assignable to the second processing process 206 increases. Accordingly, the second processing process 206, which is closer to the printing unit 209 on the pipeline and has greater impact on the printing processing, may be preferentially used.

Next, a procedure which is used when the control process 210 determines the assignment of the cores to the first processing process 203 and the second processing process 206 and instructs the processing processes to execute the processing will be described.

FIGS. 6 to 10 are flowcharts of the control algorithm according to the present exemplary embodiment. The processing of the flowcharts is executed according to an overall management performed by the control process 210. Each process (each processing unit) that executes this flowchart is realized by the CPUs 101, 103, 111, and 113 executing a processing program.

<Flow of Overall Processing>

Figure 6:
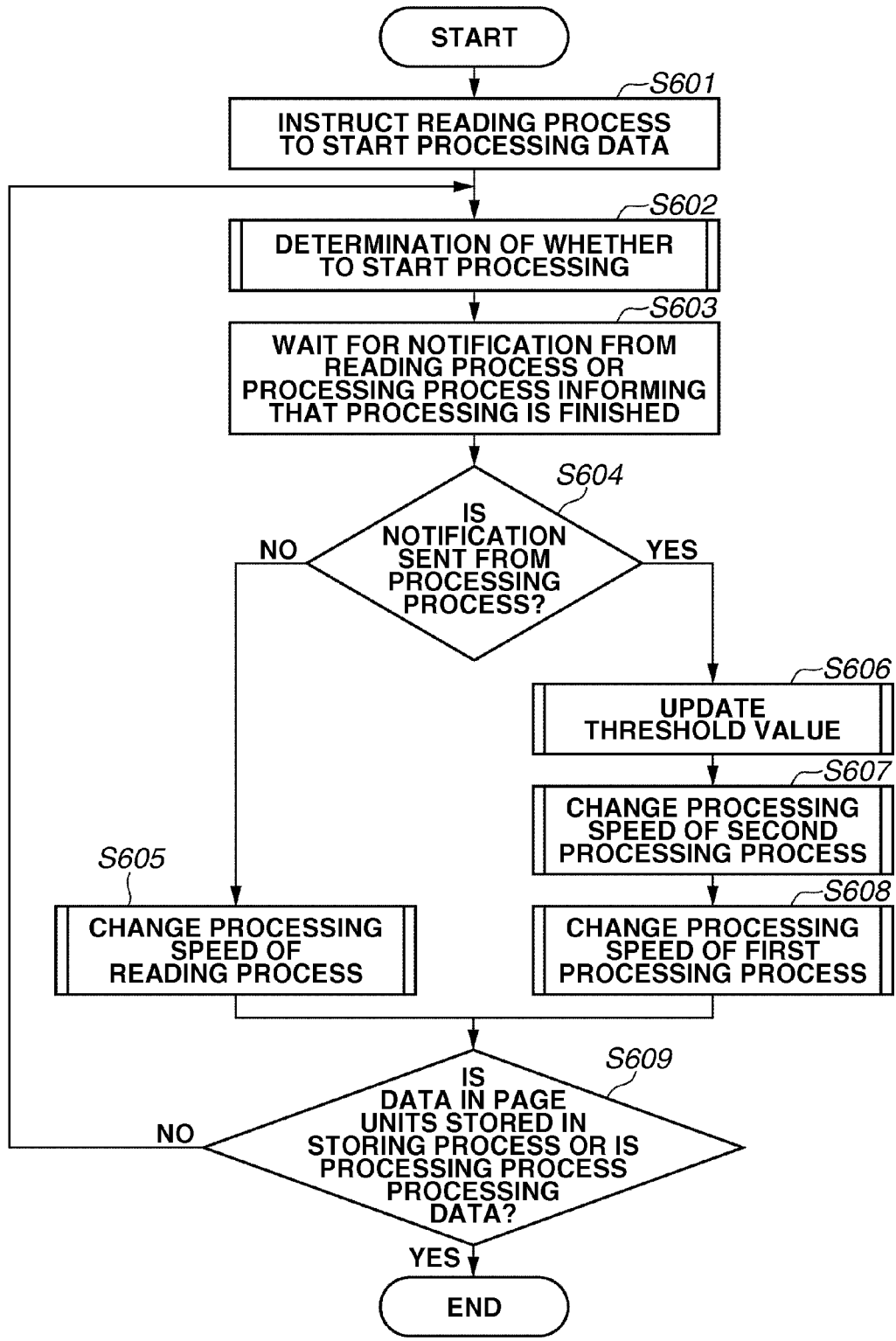
FIG. 6 is a flowchart illustrating overall processing executed by the printing system according to the first exemplary embodiment.

FIG. 6 is a flowchart illustrating the overall processing executed by the computer according to the present exemplary embodiment. The processing of this flowchart is controlled by the control process 210.

In step S601, the control process 210 instructs the reading process 201 to start the processing, and the processing proceeds to step S602.

In step S602, the control process 210 invokes a subroutine 5621 (see FIG. 7) and determines whether each processing process and printing unit is to start the processing.

In step S603, the control process 210 waits for a notification from the reading process 201 or the processing process informing that the processing has been completed. When the report is received, the processing proceeds to step S604.

In step S604, the control process 210 determines whether the received notification is a notification sent from the processing process. If the notification is not sent from the processing process (NO in step S604), the processing proceeds to step S605. If the report is sent from the processing process (YES in step S604), the processing proceeds to S606.

In step S605, the control process 210 invokes a subroutine 5641 (see FIG. 8) and changes the processing speed of the reading process 201.

In step S606, the control process 210 invokes a subroutine 5661 (see FIG. 9) and updates the threshold value.

In step S607, the control process 210 changes the processing speed of an N-th processing process where N is 2. In other words, the control process 210 invokes a subroutine 5681 (see FIG. 10) that changes the processing speed of the second processing process 206. The processing speed of the second processing process 206 may be changed by the control process 210 controlling (adjusting) the assignment of the core to the second processing process 206.

In step S608, the control process 210 changes the processing speed of the N-th processing process where N is 1. In other words, the control process 210 invokes a subroutine 5681 (see FIG. 10) that changes the processing speed of the first processing process 203. The processing speed of the first processing process 203 may be changed by the control process 210 controlling (adjusting) the assignment of the core to the first processing process 203.

The processing speed of the second processing process 206 is changed in step S607 before the processing speed of the first processing process 203 is changed in step S608. This means that the control of the assignment of the core to the second processing process 206 is prioritized over the control of the assignment of the core to the first processing process 203.

In step S609, the control process 210 determines whether a page is stored in any of the storing processes or the processing process is currently processing data. If a page is stored in any of the storing process or the processing process is currently processing data (YES in step S609), the processing ends. If a page is not stored or the processing process is not processing data (NO in step S609), the processing returns to step S602.

The flow of the overall processing is as described above.

<Subroutine of Processing Start Determination>

Figure 7:
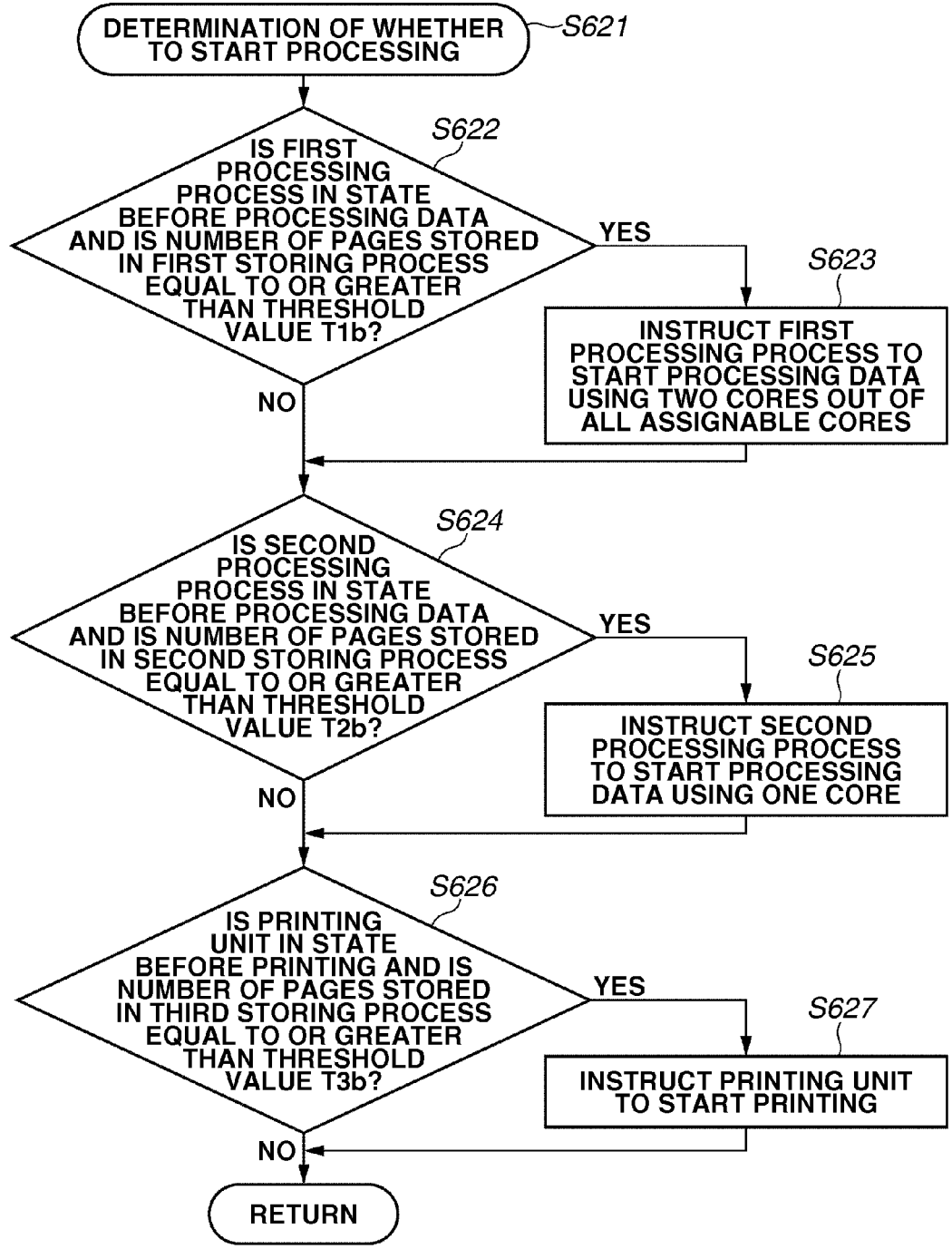
FIG. 7 is a flowchart illustrating determination processing of a processing start operation.

Next, the processing flow of the subroutine 5621 invoked by the control process 210 in step S602 will be described with reference to FIG. 7.

In step S622, the control process 210 determines whether the first processing process 203 has not yet started processing the data and the number of pages stored in the first storing process 202 is equal to or greater than the threshold value T1$b$. Herein, the first processing process 203 is in a state corresponding to "not yet started processing the data" in the period from when the printing system has received a print job including PDL data to just before the PDL data included in the print job is converted into intermediate data by the first processing process 203 for the first time. If the first processing process 203 is in such a state and the number of pages is equal to or greater than the threshold value T1$b$ (YES in step S622), the processing proceeds to step S623. If the first processing process 203 is not in such a state or the number of pages is smaller than the threshold value T1$b$ (NO in step S622), the processing proceeds to step S624.

In step S623, by using all the assignable cores in the core group 211, the control process 210 instructs the first processing process 203 to start processing the data using two cores, and the processing proceeds to step S624. In other words, the control process 210 starts one or more first processing processes 203, assigns the two cores to each of them, and instructs them to start processing data.

In step S624, the control process 210 determines whether the second processing process 206 has not yet started processing the data and the number of pages stored in the second storing process 205 is equal to or greater than the threshold value T2$b$. If the second processing process 206 is in such a state and the number of pages is equal to or greater than the threshold value T2$b$ (YES in step S624), the processing proceeds to step S625. If the second processing process 206 is not in such a state or the number of pages is smaller than the threshold value T2$b$ (NO in step S624), the processing proceeds to step S626.

In step S625, by using the assignable cores in the core group 211, the control process 210 instructs the second processing process 206 to start processing the data using one core, and the processing proceeds to step S626. In other words, the control process 210 starts the second processing process 206, assigns the core to the processing process 206, and instructs the processing process 206 to start processing the data.

In step S626, the control process 210 determines whether the printing unit 209 has not yet started printing the data and the number of pages stored in the third storing process 208 is equal to or greater than the threshold value T3$b$. If the printing unit 209 is in such a state and the number of pages is equal to or greater than the threshold value T3$b$ (YES in step S624), the processing proceeds to step S625. If the printing unit 209 is not in such a state or the number of pages is smaller than the threshold value T3$b$ (NO in step S624), the processing proceeds to step S603 in FIG. 6.

In step S627, the control process 210 instructs the printing unit 209 to start printing, and then the processing proceeds to step S603 in FIG. 6.

The flow of the subroutine 5621 regarding the determination of whether to start processing is as described above.

<Subroutine of Changing Speed of Reading Process>

Figure 8:
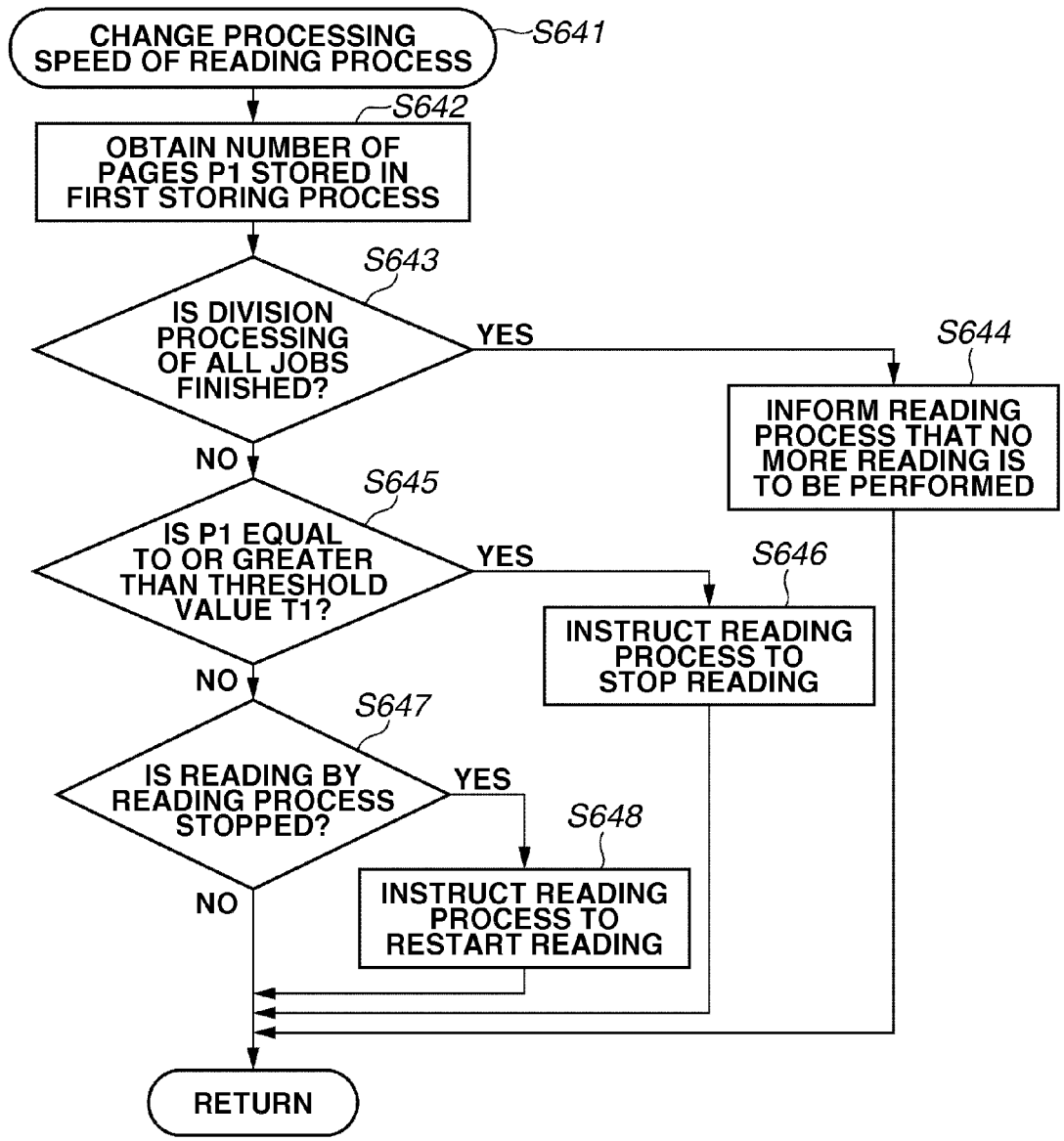
FIG. 8 is a flowchart illustrating changing processing of a processing speed of a reading process.

Next, the processing flow of the subroutine 5641 invoked by the control process 210 in step S605 will be described with reference to FIG. 8.

In step S642, the control process 210 obtains the number of pages P stored in the first storing process 202, and the processing proceeds to step S643.

In step S643, the control process 210 determines whether all the PDL data which has been received via the NIC 107 is divided into data in units of processing. In other words, the control process 210 determines whether all the division processing of the job is finished. If all the division processing of the job is finished (YES in step S643), the processing proceeds to step S644. If all the division processing of the job is not yet finished (NO in step S643), the processing proceeds to step S645.

In step S644, the control process 210 informs the reading process 201 that no more reading is to be performed, and the processing proceeds to step S609 in FIG. 6.

In step S645, the control process 210 determines whether the number of pages P obtained in step S642 is equal to or greater than the threshold value T1$a$. If the number of pages P is equal to or greater than the threshold value T1$a$ (YES in step S645), the processing proceeds to step S646. If the number of pages P is smaller than the threshold value T1$a$ (NO in step S645), the processing proceeds to step S647.

In step S646, the control process 210 instructs the reading process 201 to temporarily stop reading, and the processing proceeds to step S609 in FIG. 6.

In step S647, the control process 210 determines whether the reading by the reading process 201 is temporarily stopped. If the reading is temporarily stopped (YES in step S647), the processing proceeds to step S648. If the reading is not temporarily stopped (NO in step S647), the processing proceeds step S609 in FIG. 6.

In step S648, the control process 210 instructs the reading process 201 to restart the reading, and the processing proceeds to step S609 in FIG. 6.

The flow of the subroutine 5641 regarding changing the processing speed of the reading process is as described above.

<Subroutine of Updating Threshold Value>

Figure 9:
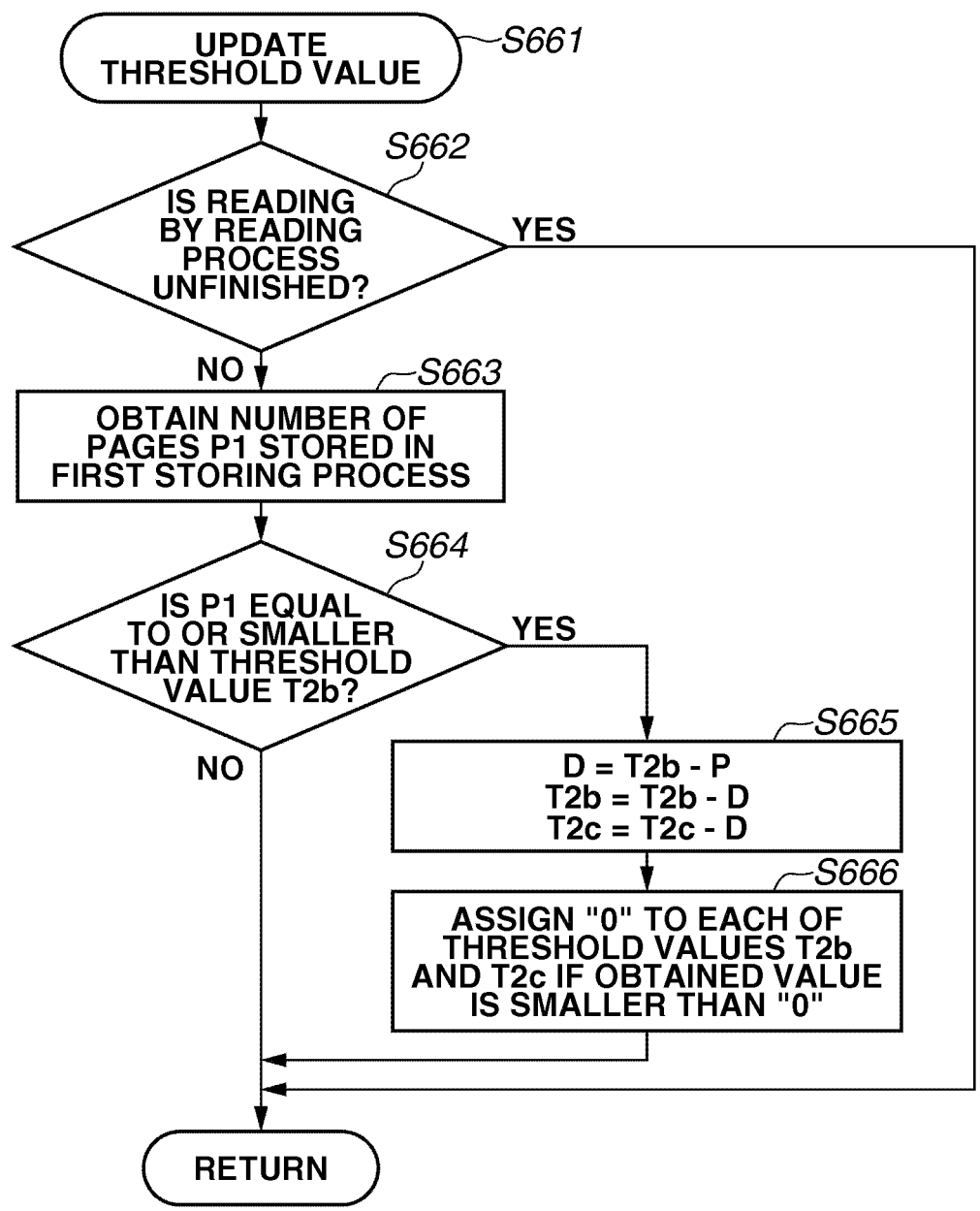
FIG. 9 is a flowchart illustrating update processing of a threshold value.

Next, the processing flow of the subroutine 5661 invoked by the control process 210 in step S606 will be described with reference to FIG. 9.

In step S662, the control process 210 determines whether the processing of the reading process 201 is not yet finished. If the processing of the reading process 201 is yet unfinished (YES in step S662), the processing proceeds to step S607 in FIG. 6. If the processing of the reading process 201 is finished (NO in step S662), the processing proceeds to step S663.

In step S663, the control process 210 obtains the number of pages P stored in the first storing process 202, and the processing proceeds to step S664.

In step S664, the control process 210 determines whether the number of pages P obtained in step S663 is equal to or smaller than the threshold value T2$b$. If the number of pages P is equal to or smaller than the threshold value T2$b$ (YES in step S664), the processing proceeds to step S665. If the number of pages P is greater than the threshold value T2$b$ (NO in step S664), the processing proceeds to step S607 in FIG. 6.

In step S665, the control process 210 obtains a variable D by subtracting the number of pages P which has been obtained in step S663 from the threshold value T2$b$. Then, the control process 210 updates the threshold value T2$b$ using the value obtained by subtracting the variable D from the threshold value T2$b$. Further, the control process 210 updates the threshold value T2$c$ by using a value obtained by subtracting the variable D from the threshold value T2$c$. Then, the processing proceeds to step S666.

In step S666, the control process 210 updates the threshold value T2$b$ by setting it to zero if the obtained threshold value T2$b$ is smaller than zero. Similarly, the control process 210 updates the threshold value T2$c$ by setting it to zero if the obtained threshold value T2$c$ is smaller than zero. Then, the processing proceeds to step S607 in FIG. 6.

The flow of the subroutine 5661 regarding updating the threshold value is as described above.

<Subroutine of Changing Processing Speed of N-Th Processing Process>

Figure 10:
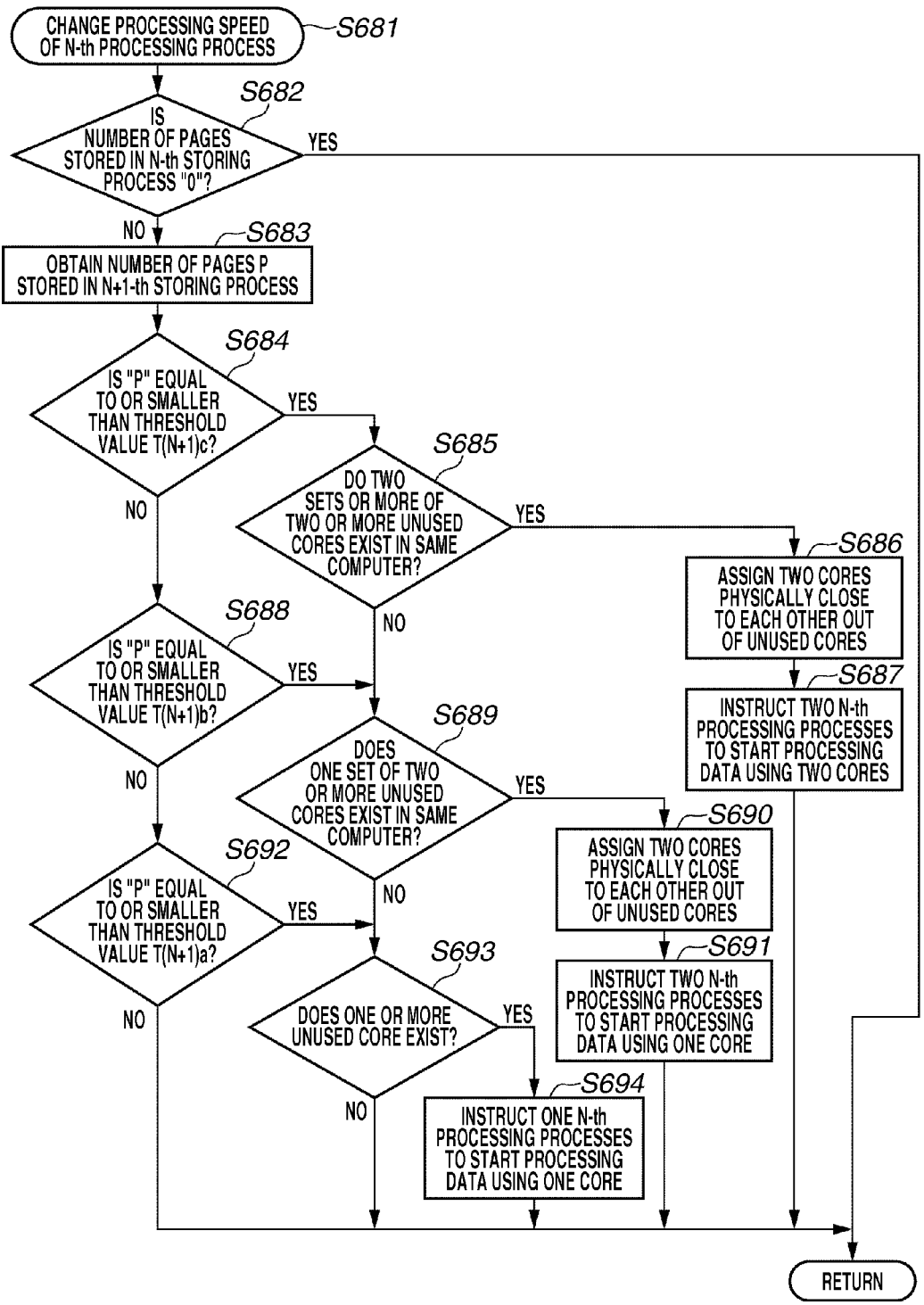
FIG. 10 is a flowchart illustrating changing processing of a processing speed of an N-th processing process.

Next, the processing flow of the subroutine 5681 invoked by the control process 210 in steps S607 and S608 will be described with reference to FIG. 10. In other words, the subroutine 5681 regarding changing the processing speed of the N-th processing process will be described. The N-th processing process, N-th storing process, N+1-th storing process, and threshold values T(N+1)$a$, T(N+1)$b$, T(N+1)$c$ correspond to the first processing process 203, the first storing process 202, the second storing process 205, and the threshold values T2$a$, T2$b$, and T2$c$ where N is 1, respectively. Similarly, The N-th processing process, N-th storing process, N+1-th storing process, and threshold values T(N+1)$a$, T(N+1)$b$, T(N+1)$c$ correspond to the second processing process 206, the second storing process 205, the third storing process 208, and the threshold values T1$a$, T3$b$, and T3$c$ where N is 2, respectively.

In step S682, the control process 210 determines whether the number of pages stored in the N-th storing process is zero. If the number of pages is zero (YES in step S682), the processing proceeds to step S608 in FIG. 6. If the number of pages is not zero (NO in step S682), the processing proceeds to step S683.

In step S683, the control process 210 obtains the number of pages P stored in the N+1-th storing process, and the processing proceeds to step S684.

In step S684, the control process 210 determines whether the number of pages P obtained in step S683 is equal to or smaller than the threshold value T(N+1)$b$. If the number of pages P is equal to or smaller than the threshold value T(N+1)$b$ (YES in step S684), the processing proceeds to step S685. If the number of pages P is greater than the threshold value T(N+1)$b$ (NO in step S684), the processing proceeds to step S688.

In step S685, the control process 210 determines whether two sets or more of two or more unused (unassigned) cores exist in the same computer. If two sets or more of two or more unused cores exist in the same computer (YES in step S685), the processing proceeds to step S686. If two sets or more of two or more unused cores do not exist in the same computer (NO in step S685), the processing proceeds to step S689.

In step S686, the control process 210 assigns two cores, which are unused and physically close to each other, to one N-th processing process. Next, the control process 210 assigns two cores which are physically close to each other in the rest of the unused cores to another N-th processing process, and the processing proceeds to step S687. More specifically, in this step, the control process 210 assigns each set of the two cores in the same computer to each of the two N-th processing processes. In other words, the control process 210 assigns one set of two unused cores with close serial numbers in the same computer of all the unused cores each of which having a serial number illustrated in FIGS. 3A and 3B to one N-th processing process. Similarly, the control process 210 further assigns the other set of two unused cores with close serial numbers in the same computer to another N-th processing process. This is because data transfer losses may be reduced when the N-th processing processes operate in the same computer.

In step S687, the control process 210 instructs each of the two N-th processing processes to start executing the process using the two cores, and the processing proceeds to step S608 in FIG. 6.

In step S688, the control process 210 determines whether the number of pages P obtained in step S683 is equal to or smaller than the threshold value T(N+1)$b$. If the number of pages P is equal to or smaller than the threshold value T(N+1)$b$ (YES in step S688), the processing proceeds to step S689. If the number of pages P is greater than the threshold value T(N+1)$b$ (NO in step S688), the processing proceeds to step S692.

In step S689, the control process 210 determines whether one set of two or more unused core exists in the same computer. If one set of two or more unused cores exists in the same computer (YES in step S689), the processing proceeds to step S690. If one set or more of two or more unused cores do not exist in the same computer (NO in step S689), the processing proceeds to step S693.

In step S690, the control process 210 assigns two cores, which are unused and physically close to each other, to two N-th processing processes, and the processing proceeds to step S691. More precisely, in this step, the control process 210 assigns two unassigned cores in the same computer to the two N-th processing processes. In other words, the control process 210 assigns one unused core of all the unused cores each of which having a serial number illustrated in FIGS. 3A and 3B to one N-th processing process. Similarly, the control process 210 further assigns the other unused core which is close to the serial number of the assigned core to the other N-th processing process. This is because data transfer loss may be reduced if the N-th processing processes operate in the same computer.

In step S691, the control process 210 instructs each of the two N-th processing processes to start executing the process using the core, and the processing proceeds to step S608 in FIG. 6.

In step S692, the control process 210 determines whether the number of pages P obtained in step S683 is equal to or smaller than the threshold value T(N+1)a. If the number of pages P is equal to or smaller than the threshold value T(N+1)a (YES in step S692), the processing proceeds to step S693. If the number of pages P is greater than the threshold value T(N+1)a (NO in step S692), the processing proceeds to step S608 in FIG. 6.

In step S693, the control process 210 determines whether one or more unused cores exist. If one or more unused cores exist (YES in step S693), the processing proceeds to step S694. If one or more unused cores do not exist (NO in step S693), the processing proceeds to step S608 in FIG. 6.

In step S694, the control process 210 assigns one unused core to one N-th processing process and instructs the N-th processing process to start the processing using the core. Then, the processing proceeds to step S608 in FIG. 6.

The flow of the subroutine 5681 regarding changing the processing speed of the N-th processing process is as described above.

As described above, the printing system according to the present exemplary embodiment has a pipeline structure including two types of processing processes. Further, the printing system of the present exemplary embodiment stores the data, which has undergone the processing performed by the processing process, in the storing processes, and controls the number of processor cores to be assigned to the processing processes according to the amount of data stored in the storing processes. By providing storing units that store processing-completed data processed by the processing units, the variation in processing time of the processing units may be absorbed. Further, by controlling the number of cores assigned to the processing units on the basis of the amount of data stored in the storing units, the processing speed of the processing units may be adjusted and data may be stably supplied to the storing units. As a result, waiting time of the unit in the subsequent stage that further processes the processing-completed data output from the preceding stage may be reduced.

Further, if the amount of data stored in the storing processes exceeds a threshold value (e.g., T2a, T3a), the printing system according to the present exemplary embodiment reduces the processing speed of the processing processes by reducing the number of cores assigned to the processing processes. As a result, the processing processes execute processing at such a processing speed that the amount of data stored in the storing process of the subsequent stage is controlled to stay within a predetermined range. Thus, the memory of the storing process may be saved without unnecessarily increasing the amount of data stored in the storing process.

Although the number of cores assigned to one processing process is one or two cores according to the present exemplary embodiment, the number of cores is not limited to such an example.

According to the first exemplary embodiment, as a method for obtaining the number of pages stored in the storing process, the control process 210 determines the state of the storing process when the processing executed by the processing process is completed. Next, another method used by the control process 210 in obtaining the number of pages stored in the storing process will be described.

Figure 11A:
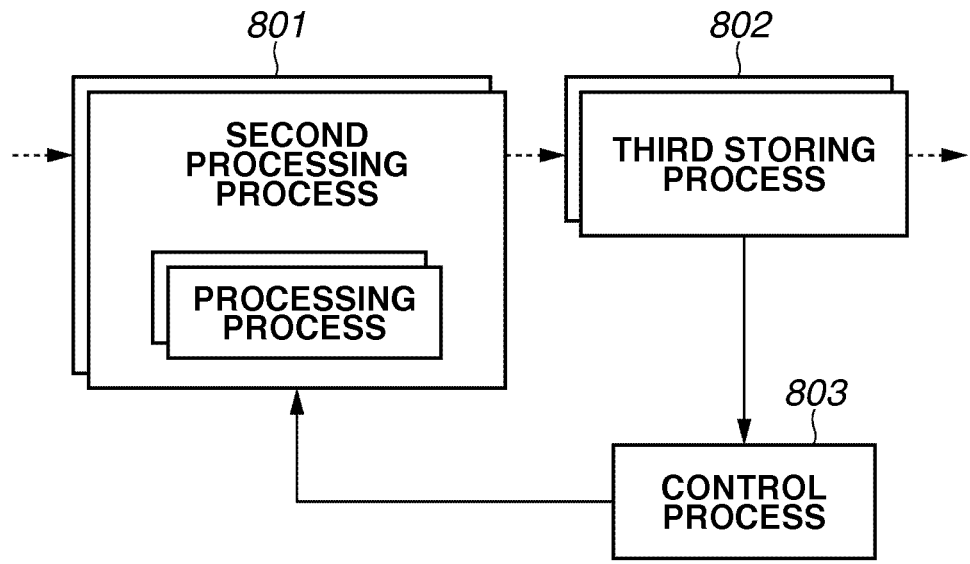
FIGS. 11A and 11B are block diagrams illustrating methods for obtaining a number of pages of the data stored in the storing process of the printing system.
Figure 11B:
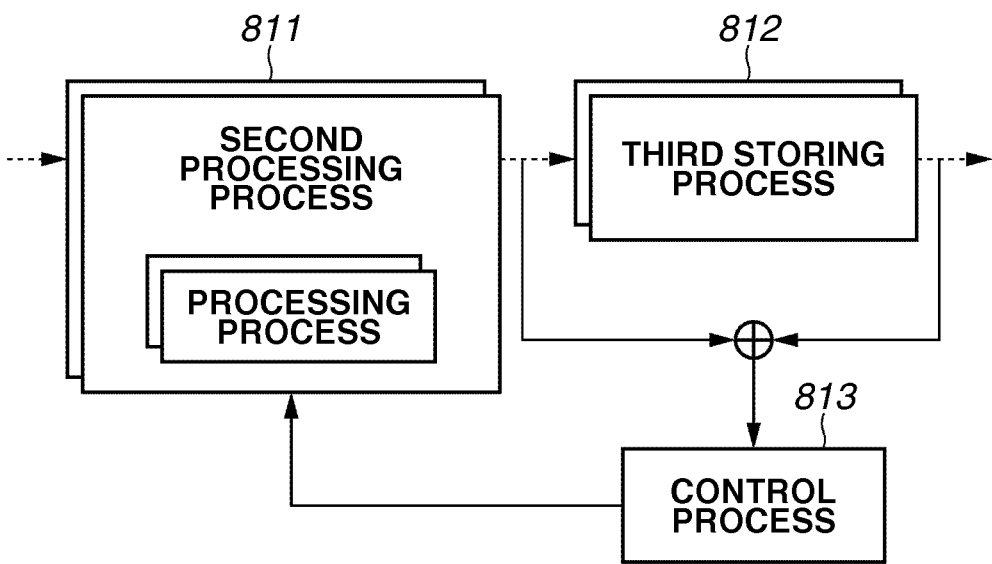

In FIGS. 11A and 11B, a second processing process 801 and a second processing process 811 correspond to the second processing process 206, a third storing process 802 and a third storing process 812 correspond to the third storing process 208, and a control process 803 and a control process 813 correspond to the control process 210 described above with reference to FIG. 2 of the first exemplary embodiment. FIGS. 11A and 11B illustrate two methods employed by the control process 210 in obtaining the number of pages stored in the storing process. The methods use feed-back control performed by the second processing process and the third storing process.

In FIG. 11A, as the control process 210 does according to the first exemplary embodiment, the control process 803 monitors the number of pages stored in the third storing process 802 at regular intervals by using a timer and directly obtains the number of pages from the third storing process 802. Then, according to feed-back processing based on the obtained number of pages, the control process 803 assigns a core to the second processing process 801. If the control process 803 monitors the third storing process 802 more frequently, although the state of the control process 803 may be obtained more accurately, since the number of access times is increased, the system load will be increased.

FIG. 11B illustrates a modification 1 of the first exemplary embodiment. The control process 813 indirectly obtains the number of pages stored in the third storing process 812 by obtaining the flow of data in and out of the third storing process 812. The control process 813 may obtain the operation state more promptly according to the operation timing of the second processing process 811 and the printing unit 209. Since the number of pages stored in the third storing process 812 is obtained when the data is transmitted/received, although the difference in the acquisition time may be reduced, additional load is applied to the printing system when a great amount of data is transmitted/received.

According to the first exemplary embodiment, the PDL data is divided into page units and parallel processing is performed by a plurality of processing processes. Next, a method for dividing the PDL data into data granularity other than the page unit and data granularity when a plurality of threads performs parallel processing in the processing processes will be described.

FIGS. 12A and 12B are function block diagrams of blocks that correspond to the reading process 201, the storing processes, and the processing processes illustrated in FIG. 2 according to the first exemplary embodiment. Each block shows the granularity of the data processed or stored in the block. After the PDL data is divided by the reading process 201, the data, which is to be processed by the first processing process 203 and the second processing process 206, may be divided into finer granularity. For example, the data may be divided into page units, rendering object units, tile units, or band units. Further, the granularity of the data may be arbitrarily combined. For example, a page data group, a rendering object group, a tile group, or a band group obtained by combining the above units may be used.

In FIGS. 12A and 12B, reading processes 901 and 911 correspond to the reading process 201. First storing processes 902 and 912 correspond to the first storing process 202. First processing processes 903 and 913 correspond to the first processing process 203. Processing threads 904 and 914 correspond to the processing thread 204. Second storing processes 905 and 915 correspond to the second storing process 205. Second processing processes 906 and 916 correspond to the second processing process 206. Processing threads 907 and 917 correspond to the processing thread 207. Third storing processes 908 and 918 correspond to the third storing process 208.

In FIG. 12A, the reading process 901 reads the PDL data, divides the PDL data into data in single page units, and stores the obtained data in the first storing process 902. The first processing process 903 divides the data in page units into rendering objects. Then, parallel processing is performed by the processing threads 904. The first processing process 903 merges the results of the processing performed by each of the processing threads 904, generates intermediate data, and stores the generated intermediate data in the second storing process 905. Then, the second processing process 906 divides the intermediate data into tiles and parallel processing of the tiles is performed by the processing threads 907. The second processing process 906 merges the results of the processing performed by each of the processing threads 907, generates printing data, and stores the generated printing data in the third storing process 908.

In FIG. 12B, the reading process 911 reads the PDL data, divides the PDL data into data in a plurality of page units, and stores the obtained data in the first storing process 912. The first processing process 913 divides the data in a plurality of page units into data in units of single page, and parallel processing is performed by the processing threads 914. The first processing process 913 generates intermediate data using the results of the processing performed by each of the processing threads 914, and stores the generated intermediate data in the second storing process 915. Then, the second processing process 916 divides the intermediate data into bands, and parallel processing is performed by the processing threads 917. The second processing process 916 merges the results of the processing performed by each of the processing threads 917, generates printing data, and stores the generated printing data in the third storing process 918.

When the data is finely grained, since the time necessary in processing one piece of data is reduced, the time one core is used will be reduced. Accordingly, the algorithm used for assigning the cores to the first processing process and the second processing process may be applied more easily. Further, since the data size is reduced, the transfer throughput may be enhanced even if a low-speed line is used. Thus, the present exemplary embodiment is applicable to distributed processing using LAN, Wide Area Network (WAN), and a cluster computer.

Further, since long processing time may be necessary in dividing each page of PDL data depending on the data size, dividing the data into a plurality of pages with reduced granularity may be effective in reducing processing time.

The data granularity may be set when the printing system is delivered, when the operator submits a job, and when the printing system is operating, according to the request of the customer when the printing system is delivered, calculation by a simulator, or manual input based on past experience of the operator.

According to the first exemplary embodiment, the hardware configuration on which the processing program runs and the performed processing are described. Next, an example of a hardware configuration for realizing the printing system will be described. Since the reading process, the first processing process, the second processing process, the first storing process, the second storing process, the third storing process, and the printing unit described below are similar to each process and printing unit described above according to the first exemplary embodiment, their descriptions are not repeated.

FIG. 13 illustrates an example realized by a plurality of computers. Each computer executes one type of process such as the reading process, the first processing process, and the second processing process. Further, each computer also executes the storing process in a stage subsequent to the process executed by each computer. In other words, a computer 1301 executes the reading process and the first storing process. Further, computers 1302, 1303, and 1304 execute the first processing process and the second storing process. A computer 1305 executes the control process. Computers 1306, 1307, and 1308 execute the second processing process and the third storing process. A printing machine 1309 is a printing apparatus having the function of the printing unit 209.

Since the computers are configured as illustrated in FIG. 13, data is transferred from each processing process to the storing process in the subsequent stage via the data bus if the processes are in the same computers. Further, if data is transferred between different computers, for example, LAN is used in addition to the data bus.

When high-resolution printing is required, a large amount of PDL data is input or a large amount of printing data is transferred to the printing machine (e.g., printing data of 1200 dpi is approximately 500 MB). If the exchange of large volumes of data is concentrated on a communication path of, for example, LAN, since the communication speed is slow compared to the data bus, it causes delay in the data transfer. Accordingly, it is preferable to avoid such concentration.

The control process executed by the computer 1305 of the printing system according to the present exemplary embodiment may obtain a use state of the cores of the processing processes and the number of pages stored in the storing processes. Further, since the control process executed by the computer 1305 may determine the cores to be assigned to the processing processes after obtaining the information of the physical locations of the computer and the cores, the control process may also determine the communication path to be used.

When data is transferred from a storing process to a processing process, if an unused core exists in the computer of the storing process, the core is assigned to the processing process before the conversion processing is performed. If an unused core does not exist in the computer of the storing process, a computer having the largest number of unused cores is searched, and the cores are assigned to the processing process before the conversion processing is performed.

When data is transferred from a processing process to a storing process, if a storing process having an unused memory used for storing data in a computer of the processing process exists, the data is stored in the storing process.

If a storing process for storing data having an unused memory does not exist in a computer of the processing process, a storing process for storing data having an unused memory in a different computer is searched and data is stored in that storing process.

According to the above-described exemplary embodiments and the modifications, the information used for determining the core assignment which the control process obtains from the storing process may be a number of data pieces or an amount of data instead of the number of pages.

When the assignment of the cores to the processing process when data is transferred from the storing process to the processing process is determined, another computer having the least number of unused cores is searched. Then, the core is assigned to the processing process, and conversion processing is performed. In this manner, processing may be concentrated on a small number of computers.

In determining the storing process to be used when data is transferred from the processing process to the storing process, by storing data in a storing process with the most unused memory, the amount of stored data for each computer may be leveled.

Aspects of the embodiments may also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium). In such a case, the system or apparatus, and the recording medium where the program is stored, are included as being within the scope of the disclosure.

While the disclosure has been described with reference to exemplary embodiments, it is to be understood that the disclosure is not limited to the disclosed exemplary embodiments. The scope of the following claims is to be accorded the broadest interpretation so as to encompass all modifications, equivalent structures, and functions.

This application claims priority from Japanese Patent Application No. 2012-108684 filed May 10, 2012, which is hereby incorporated by reference herein in its entirety.

What is claimed is:

1. An information processing system including a plurality of processor cores for generating printing data to be supplied to a printing unit from Page Description Language (PDL) data, the system comprising:
    a first processing unit configured to generate intermediate data by processing the PDL data using a specified processor core of the plurality of processor cores and store the intermediate data in an intermediate data storing unit;
    a second processing unit configured to generate the printing data by processing the intermediate data stored in the intermediate data storing unit using a processor core other than the specified processor core of the plurality of processor cores, and store the printing data in a printing data storing unit, and
    a control unit configured to adjust a number of processor cores used by the first processing unit on the basis of an amount of intermediate data stored in the intermediate data storing unit, and adjust a number of processor cores used by the second processing unit on the basis of an amount of printing data stored in the printing data storing unit.

2. The information processing system according to claim 1, further comprising a PDL data storing unit configured to store the PDL data to be supplied to the first processing unit,
    wherein if the amount of the PDL data stored in the PDL data storing unit is smaller than a threshold value T$1b$, the control unit controls the first processing unit so that processing is performed using all the processor cores of the plurality of processor cores.

3. The information processing system according to claim 1, wherein the control unit prioritizes control of adjustment of the number of processor cores to be used by the second processing unit over adjustment of the number of processor cores to be used by the first processing unit.

4. An information processing apparatus for controlling a plurality of resources for processing processing data, the apparatus comprising:
    a control unit configured to control the plurality of resources in such a manner that a specified resource of the plurality of resources functions as a first processing unit which, by processing first processing data, generates second processing data and stores the second processing data in a first data storing unit, and a resource other than the specified resource of the plurality of resources functions as a second processing unit which, by processing second processing data, generates third processing data and stores the third processing data in a second data storing unit, and
    wherein the control unit adjusts an amount of the specified resource which functions as the first processing unit of the plurality of resources on the basis of an amount of the second processing data stored in the first data storing unit and adjusts an amount of the resources other than the specified resource out of the plurality of resources which functions as the second processing unit of the plurality of resources on the basis of an amount of the third processing data stored in the second data storing unit.

5. The information processing apparatus according to claim 4,
    wherein if the amount of the second processing data stored in the first data storing unit is equal to or smaller than a threshold value T$2b$, the control unit causes a resource that functions as neither the first processing unit nor the second processing unit of the plurality of resources to function as the first processing unit,
    wherein if the amount of the third processing data stored in the second data storing unit is equal to or smaller than a threshold value T$3b$, the control unit causes a resource that functions as neither the first processing unit nor the second processing unit of the plurality of resources to function as the second processing unit.

6. The information processing apparatus according to claim 4,
    wherein if the amount of the second processing data stored in the first data storing unit exceeds a threshold value T$2a$, which is greater than a threshold value T$2b$, the control unit reduces the amount of resources that functions as the first processing unit, and
    wherein if the amount of the third processing data stored in the second data storing unit exceeds a threshold value T$1a$, which is greater than a threshold value T$3b$, the control unit reduces the amount of resources that function as the second processing unit.

7. The information processing apparatus according to claim 6,
wherein the first processing unit obtains the first processing data from a unit storing the first processing data and performs processing,
wherein if the amount of the first processing data stored in the unit storing the first processing data is equal to or smaller than the threshold value T$2b$, the control unit updates the threshold value T$2b$ to be smaller.

8. The information processing apparatus according to claim 4,
wherein each of the plurality of resources is a processor core included in one or more multi-core processors,
wherein in order to function the processor core as the first processing unit or the second processing unit, the control unit performs control so that one processing thread operates, using the processor core in an exclusive relation with another processing thread, as an execution unit of processing performed by the first processing unit or the second processing unit.

9. The information processing apparatus according to claim 4, further comprising a unit for storing the first processing data to be supplied to the first processing unit,
wherein if the amount of the first processing data stored in the unit for storing the first processing data is smaller than a threshold value T$1b$, the control unit causes all the resources of the plurality of resources to function as the first processing unit.

10. The information processing apparatus according to claim 4, wherein the control unit prioritizes control of adjustment of the amount of the resources caused to function as the second processing unit over control of adjustment of the amount of the resources caused to function as the first processing unit.

11. The information processing apparatus according to claim 4, wherein the control unit controls the plurality of resources in such a manner that a resource which is determined by a selection of a resource having a shorter data transfer distance to the first data storing unit from a resource that functions as neither the first processing unit nor the second processing unit of the plurality of resources functions as the first processing unit, and a resource which is determined by a selection of a resource having a shorter data transfer distance to the second data storing unit from the resource that functions as neither the first processing unit nor the second processing unit of the plurality of resources functions as the second processing unit.

12. The information processing apparatus according to claim 4, wherein the third processing data is printing data in a data format printable by a printing unit, and the second processing data is intermediate data which is data before conversion to the printing data.

13. The information processing apparatus according to claim 4, wherein at least either the first processing unit or the second processing unit performs parallel processing of processing data for each processing unit using the plurality of resources.

14. The information processing apparatus according to claim 4, wherein at least either the first processing unit or the second processing unit divides the data to be processed into units of rendering object, band, or tile, and performs processing of the divided data to be processed.

15. An information processing apparatus for obtaining intermediate data generated from Page Description Language (PDL) data stored in a first storing unit using a specified processor core of a plurality of processor cores, generating printing data to be supplied to a printing unit from the obtained intermediate data, and storing the printing data in a second storing unit, the apparatus comprising:
a processing unit configured to generate the printing data by processing the intermediate data stored in a intermediate data storing unit by using a specified processor core of the plurality of processor cores, and store the printing data in a printing data storing unit,
wherein the specified processor core of the plurality of processor cores is a processor core excluding a processor core, which is being used as a first processing unit for generating the intermediate data by processing the PDL data and storing the intermediate data in the intermediate data storing unit, from the plurality of processor cores, and
a control unit configured to adjust a number of the processor cores to be used by the second processing unit on the basis of an amount of printing data stored in the printing data storing unit.

16. A printing system which performs printing while generating printing data from Page Description Language (PDL) data using a plurality of processor cores, the system comprising:
a dividing unit configured to divide the PDL data into data in units of processing;
a first storing unit configured to store the data in units of processing;
a first processing unit configured to interpret the data in units of processing and generate intermediate data by using a specified processor core of the plurality of processor cores;
a second storing unit configured to store the intermediate data;
a second processing unit configured to interpret the intermediate data and generate the printing data using a processor core other than the specified processor core of the plurality of processor cores;
a third storing unit configured to store the printing data;
a printing unit configured to print the printing data stored in the third storing unit; and
a control unit configured to, on the basis of an amount of the intermediate data stored in the second storing unit, assign the processor core which is used by neither the first processing unit nor the second processing unit of the plurality of processor cores to the first processing unit so that the amount of the intermediate data stored in the second storing unit is within a predetermined range determined by threshold values T$2a$ and T$2b$, and on the basis of an amount of the printing data stored in the third storing unit, assign the processor core which is used by neither the first processing unit nor the second processing unit of the plurality of processor cores to the second processing unit so that the amount of the printing data stored in the third storing unit is within a predetermined range determined by threshold values T$1a$ and T$3b$.

17. The printing system according to claim 16, wherein at least either the first processing unit or the second processing unit performs parallel processing of data for each processing unit using the plurality of processor cores.

18. The printing system according to claim 16, wherein the dividing unit obtains the data in units of processing by dividing the PDL data into page units or rendering object units.

19. The printing system according to claim 16, wherein at least either the first processing unit or the second processing unit divides the data to be processed into units of rendering objects, band, or tile, and performs processing of the divided data to be processed.

20. An information processing system including a plurality of resources for processing data, the system comprising:
- a first processing unit configured to generate second processing data by processing first processing data using a specified resource of the plurality of resources and store the resource in a first data storing unit;
- a second processing unit configured to generate third processing data by processing the second processing data stored in the first data storing unit using a resource other than the specified resource of the plurality of resources, and store the third processing data in a second data storing unit, and
- a control unit configured to adjust an amount of the resources used by the first processing unit on the basis of an amount of the second processing data stored in the first storing unit, and adjust an amount of the resources used by the second processing unit on the basis of an amount of the second processing data stored in the first data storing unit.

21. An information processing method executed by an information processing system including a plurality of processor cores for generating from Page Description Language (PDL) data printing data to be supplied to a printing unit, the method comprising:
- generating intermediate data by processing the PDL data using a specified processor core of the plurality of processor cores, and storing the intermediate data in an intermediate data storing unit, as a first processing;
- generating the printing data by processing the intermediate data stored in the intermediate data storing unit using a processor core other than the specified processor core of the plurality of processor cores, and store the printing data in a printing data storing unit, as a second processing, and
- adjusting a number of processor cores used in the first processing on the basis of an amount of intermediate data stored in the intermediate data storing unit, and adjusting a number of processor cores used in the second processing on the basis of an amount of printing data stored in the printing data storing unit.

22. An information processing method for controlling a plurality of resources for processing data, the method comprising:
- controlling the plurality of resources in such a manner that a specified resource of the plurality of resources functions as a first processing unit which, by processing first processing data, generates second processing data and stores the second processing data in a first data storing unit, and a resource other than the specified resource of the plurality of resources functions as a second processing unit which, by processing second processing data, generates third processing data and stores the third processing data in a second data storing unit, and
- wherein, in controlling the plurality of resources, an amount of the specified resource which functions as the first processing unit of the plurality of resources is adjusted on the basis of an amount of the second processing data stored in the first data storing unit, and an amount of the resources other than the specified resource out of the plurality of resources which functions as the second processing unit of the plurality of resources is adjusted on the basis of an amount of the third processing data stored in the second data storing unit.

23. A printing method executed by a printing system that performs printing while generating printing data from PDL data using a plurality of processor cores, the method comprising:
- interpreting the data in units of processing and generating intermediate data by using a specified processor core of the plurality of processor cores, and storing the intermediate data in a second storing unit as first processing;
- interpreting the intermediate data and generating the printing data using a processor core other than the specified processor core of the plurality of processor cores, and storing the printing data in a third storing unit as second processing;
- printing the printing data stored in the third storing unit; and
- controlling, on the basis of an amount of the intermediate data stored in the second storing unit, assignment of the processor core, which is used in neither the first processing nor the second processing, of the plurality of processor cores in the first processing in such a manner that the amount of the intermediate data stored in the second storing unit is within a predetermined range determined by threshold values $T2a$ and $T2b$, and on the basis of an amount of the printing data stored in the third storing unit, assignment of the processor, core which is used by neither the first processing nor the second processing, of the plurality of processor cores in the second processing in such a manner that the amount of the printing data stored in the third storing unit is within a predetermined range determined by threshold values $T1a$ and $T3b$.

24. An information processing method of an information processing apparatus including a plurality of resources used for processing data, the method comprising:
- generating second processing data by processing first processing data using a specified resource of the plurality of resources and storing the resource in a first data storing unit, as first processing;
- generating third processing data by processing the second processing data stored in the first data storing unit using a resource other than the specified resource of the plurality of resources, and storing the third processing data in a second data storing unit, as second processing, and
- adjusting an amount of the resources used in the first processing on the basis of an amount of the second processing data stored in the first storing unit, and adjusting an amount of the resources used in the second processing on the basis of an amount of the third processing data stored in the second data storing unit.

25. A non-transitory computer readable storage medium storing a program for causing at least one or more computers to execute the information processing method according to claim 21.

26. A non-transitory computer readable storage medium storing a program for causing at least one or more computers to execute the information processing method according to claim 22.

27. A non-transitory computer readable storage medium storing a program for causing at least one or more computers to execute the information processing method according to claim 23.

28. A non-transitory computer readable storage medium storing a program for causing at least one or more computers to execute the information processing method according to claim 24.

* * * * *